(12) United States Patent
Vankan et al.

(10) Patent No.: US 10,473,018 B2
(45) Date of Patent: Nov. 12, 2019

(54) EXHAUST LINE FOR A VEHICLE

(71) Applicant: KATCON Global S.A., Bascharage (LU)

(72) Inventors: Joseph Marie Gerard Vankan, Oudrenne (FR); Janusz Puczok, Luxembourg (LU)

(73) Assignee: KATCON GLOBAL S.A., Bascharage (LU)

( * ) Notice: Subject to any disclaimer, the term of this patent is extended or adjusted under 35 U.S.C. 154(b) by 0 days.

(21) Appl. No.: 15/837,636

(22) Filed: Dec. 11, 2017

(65) Prior Publication Data

US 2019/0162098 A1     May 30, 2019

(30) Foreign Application Priority Data

Nov. 30, 2017 (EP) ..................................... 17204823

(51) Int. Cl.
*F01N 3/28* (2006.01)
*F01N 3/20* (2006.01)

(52) U.S. Cl.
CPC ......... *F01N 3/2892* (2013.01); *F01N 3/2066* (2013.01)

(58) Field of Classification Search
CPC combination set(s) only.
See application file for complete search history.

(56) References Cited

U.S. PATENT DOCUMENTS

| 5,529,484 A | 6/1996 | Moard et al. |
| 7,152,396 B2 | 12/2006 | Cheng |
| 7,448,206 B2 | 11/2008 | Meingast et al. |
| 7,712,305 B2 | 5/2010 | Kapsos et al. |

(Continued)

FOREIGN PATENT DOCUMENTS

| CN | 104121075 A | 10/2014 |
| CN | 106014560 A | 10/2016 |

(Continued)

OTHER PUBLICATIONS

Computer-generated English language abstract for DE102015013246A1 extracted from espacenet.com database on May 2, 2018, 2 pages.

(Continued)

*Primary Examiner* — Binh Q Tran
(74) *Attorney, Agent, or Firm* — Howard & Howard Attorneys PLLC

(57) ABSTRACT

An exhaust line includes a housing having a wall with an opening and a baffle disposed within the opening. In certain embodiments, the exhaust line includes a divider between the wall and baffle that partially defines a mixing chamber for receiving an exhaust and a reducing agent, and partially defines a bypass chamber for receiving another portion of the exhaust. The divider defines an inlet and outlet facing respective upstream and downstream ends. The divider transfers heat from exhaust passing through the bypass chamber to the reducing agent inside the mixing chamber. In other embodiments, the baffle partially defines a first passageway substantially parallel to and offset from a center axis for delivering a portion of the exhaust to the mixing chamber, and a ramped surface partially defining a second passageway transverse to the first passageway for delivering another portion of the exhaust to the mixing chamber.

31 Claims, 15 Drawing Sheets

(56) References Cited

U.S. PATENT DOCUMENTS

| | | | |
|---|---|---|---|
| 7,877,983 | B2 | 2/2011 | Kunkel et al. |
| 7,975,472 | B2 | 7/2011 | Halbei et al. |
| 8,079,211 | B2 | 12/2011 | Levin et al. |
| 8,490,390 | B2 | 7/2013 | Henry et al. |
| 8,646,258 | B2 | 2/2014 | Vanvolsem et al. |
| 8,661,792 | B2 | 3/2014 | Greber et al. |
| 8,915,069 | B2 | 12/2014 | Loman |
| 9,238,991 | B2 * | 1/2016 | Solbrig ............... F01N 3/208 |
| 9,266,075 | B2 | 2/2016 | Chapman et al. |
| 9,346,017 | B2 | 5/2016 | Greber |
| 9,453,448 | B2 | 9/2016 | Levin et al. |
| 9,581,067 | B2 | 2/2017 | Guilbaud et al. |
| 9,670,811 | B2 | 6/2017 | De Rudder et al. |
| 9,714,598 | B2 * | 7/2017 | Alano ................ F01N 3/2892 |
| 9,810,123 | B2 * | 11/2017 | Kauderer ........... B01D 53/9418 |
| 10,179,315 | B2 * | 1/2019 | Brandl ................ B01F 5/0691 |
| 10,215,076 | B2 * | 2/2019 | Solipuram ........... F01N 3/2892 |
| 2008/0141662 | A1 | 6/2008 | Schuster et al. |
| 2011/0094206 | A1 | 4/2011 | Liu et al. |
| 2012/0216513 | A1 * | 8/2012 | Greber ................ F01N 3/2066 60/295 |
| 2016/0115847 | A1 | 4/2016 | Chapman et al. |
| 2016/0158714 | A1 | 6/2016 | Li et al. |
| 2016/0319720 | A1 | 11/2016 | Alano |
| 2016/0319724 | A1 | 11/2016 | Alano et al. |
| 2017/0009629 | A1 | 1/2017 | Lorch et al. |
| 2017/0066012 | A1 | 3/2017 | Hornback et al. |
| 2018/0266300 | A1 * | 9/2018 | Liu .................... F01N 13/0097 |

FOREIGN PATENT DOCUMENTS

| | | |
|---|---|---|
| CN | 106014580 A | 10/2016 |
| CN | 106285863 A | 1/2017 |
| CN | 106437982 A | 2/2017 |
| CN | 205977344 U | 2/2017 |
| CN | 206000602 U | 3/2017 |
| DE | 102015013246 A1 | 4/2016 |
| EP | 2775114 A1 | 9/2014 |
| KR | 101758217 B1 | 7/2017 |
| WO | 2016046737 A1 | 3/2016 |
| WO | 2016169709 A1 | 10/2016 |

OTHER PUBLICATIONS

Computer-generated English language abstract for KR101758217B1 extracted from espacenet.com database on May 2, 2018, 2 pages.

English language abstract for WO2016169709A1 extracted from espacenet.com database on May 2, 2018, 2 pages.

European Search Report for Application EP17204823 dated Feb. 16, 2018, 2 pages.

English language abstract and computer-generated English language translation for CN104121075A extracted from espacenet.com database on Jan. 15, 2018, 17 pages.

English language abstract and computer-generated English language translation for CN106014560A extracted from espacenet.com database on Jan. 15, 2018, 21 pages.

English language abstract and computer-generated English language translation for CN106014580A extracted from espacenet.com database on Jan. 15, 2018, 8 pages.

English language abstract and computer-generated English language translation for CN106285863A extracted from espacenet.com database on Jan. 15, 2018, 9 pages.

English language abstract and computer-generated English language translation for CN106437982A extracted from espacenet.com database on Jan. 15, 2018, 12 pages.

English language abstract for CN205977344U extracted from espacenet.com database on Jan. 15, 2018, 1 page.

English language abstract and computer-generated English language translation for CN206000602U extracted from espacenet.com database on Jan. 15, 2018, 6 pages.

English language abstract and computer-generated English language translation for EP2775114A1 extracted from espacenet.com database on Jan. 15, 2018, 19 pages.

* cited by examiner

US 10,473,018 B2

EXHAUST LINE FOR A VEHICLE

CROSS REFERENCE TO RELATED APPLICATION

The subject application claims priority to and all the benefits of European Patent Application No. 17204823.3, filed on Nov. 30, 2017, the contents of which are incorporated herein by reference in their entirety.

FIELD OF THE DISCLOSURE

The present disclosure relates generally to an exhaust line for a vehicle.

BACKGROUND

Exhaust lines are used in vehicles for routing exhaust generated by a fuel-burning engine to the atmosphere surrounding the vehicle. The exhaust generated by the engine typically includes nitrogen ($N_2$), oxygen ($O_2$), water vapor ($H_2O$), and one or more pollutants. For diesel exhaust, the pollutants may include unburned hydrocarbons (HC), carbon monoxide (CO), nitrogen oxides ($NO_x$), and various forms of diesel particulate matter (DPM). It is desirable, and even required in certain regions or countries, to reduce the pollutant(s) to an environmentally-acceptable level or form before the exhaust is released to the surrounding atmosphere. Accordingly, there is an opportunity to provide an exhaust line for a vehicle that operates to reduce pollutant(s) of an exhaust to an environmentally-acceptable form.

SUMMARY

In one embodiment of the present disclosure, an exhaust line for a vehicle having an engine generating an exhaust and a device for supplying a reducing agent for use during treatment of the exhaust comprises a mixing housing having a continuous wall defining upstream and downstream ends with the wall further defining an opening extending between the upstream and downstream ends and a port for receiving the reducing agent from the device with the wall having first and second segments, a first treatment block adjacent the downstream end of the mixing housing for treatment of the exhaust, a baffle disposed within the opening of the mixing housing, and a divider disposed between the wall and the baffle with the divider having first and second surfaces, the first surface of the divider, the first segment of the wall, and the baffle defining a mixing chamber in fluid communication with the upstream end for receiving a portion of the exhaust, and the mixing chamber in fluid communication with the port for receiving the reducing agent, the second surface of the divider facing the second segment of the wall and defining a bypass chamber adjacent the mixing chamber with the divider defining a bypass inlet facing the upstream end for receiving another portion of the exhaust and a bypass outlet facing the downstream end for releasing the other portion of the exhaust with the divider operable to transfer heat from the other portion of the exhaust passing through the bypass chamber to the reducing agent inside the mixing chamber for effective treatment of the exhaust.

In another embodiment of the present disclosure, an exhaust line for a vehicle having an engine generating an exhaust and a device for supplying a reducing agent for use during treatment of the exhaust comprises a mixing housing having a continuous wall defining upstream and downstream ends with the wall further defining an opening extending between the upstream and downstream ends and a port for receiving the reducing agent from the device, a first treatment block adjacent the downstream end of the mixing housing for treatment of the exhaust, and a baffle disposed within the opening of the mixing housing with the baffle and at least a portion of the wall defining a mixing chamber for mixing the exhaust and the reducing agent, the baffle defining a center axis and having a first flange partially defining a first exhaust inlet and a first exhaust exit offset from the center axis with the first exhaust inlet and the first exhaust exit defining a first passageway extending in a direction substantially parallel to and offset from the center axis for delivering a portion of the exhaust to the mixing chamber, the baffle further having a ramped surface partially defining a second exhaust inlet and a second exhaust exit offset from the center axis with the second exhaust inlet and the second exhaust exit defining a second passageway with the second passageway at the second exhaust exit extending in a direction transverse to the first passageway for delivering another portion of the exhaust to the mixing chamber so that the portions of the exhaust and the reducing agent intersect to form a vortex in the mixing chamber.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and are not necessarily drawn to scale.

DETAILED DESCRIPTION

Referring now to the figures, wherein like numerals indicate corresponding parts throughout the several views, embodiments of an exhaust line 100 are shown throughout the figures and are described in detail below. The exhaust line 100 may be used in any type of vehicle 10 having an engine that generates an exhaust. In the example shown in FIG. 1, the vehicle 10 is a passenger vehicle having a fuel-burning engine 12. Other examples of vehicles 10 include trucks, mass transit vehicles (such as buses, trolley vehicles, etc.), commercial semi-trucks, recreational vehicles, motorcycles, boats, airplanes, and/or any other vehicle having a fuel-burning engine that generates an exhaust.

The engine 12 of the vehicle 10 is an internal combustion engine that burns fuel to generate power. In an embodiment, the internal combustion engine 12 is configured to burn diesel fuel, and the engine 12 may be referred to as a diesel engine. Upon burning the diesel fuel, and as mentioned above, the engine 12 generates an exhaust containing a mixture of gases, typically including nitrogen ($N_2$), oxygen ($O_2$), and water vapor ($H_2O$), that are released to the atmosphere surrounding the vehicle 10. In addition to the gases identified above, the exhaust also typically contains one or more pollutants, such as unburned hydrocarbons (HC), carbon monoxide (CO), nitrogen oxides ($NO_x$), and various forms of diesel particulate matter (DPM). It is desirable, and even required in certain regions or countries, to reduce one or more of these pollutants to an environmentally-acceptable form before the exhaust is released to the surrounding atmosphere.

Figure 1:
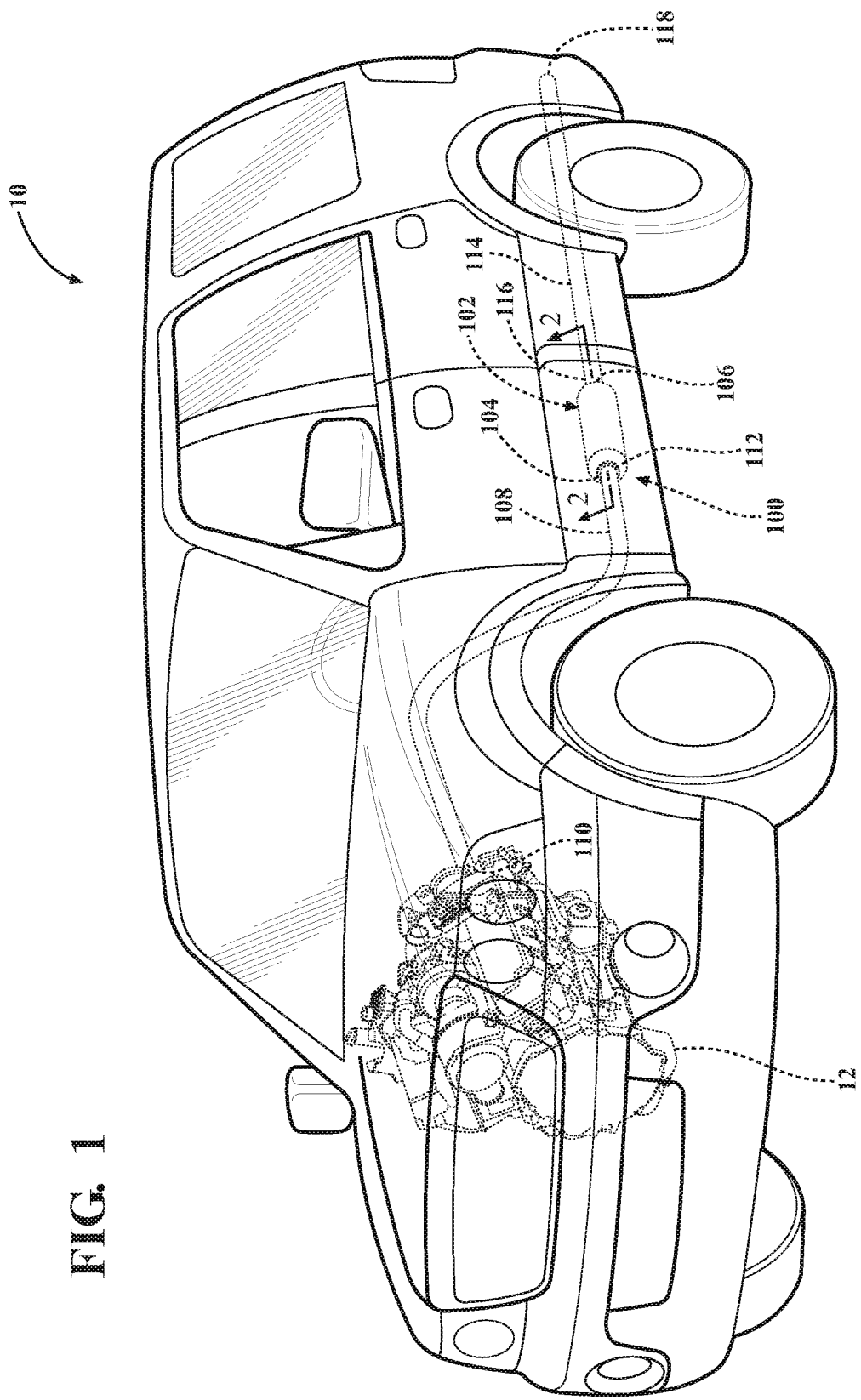
FIG. 1 is a perspective view of an example of a vehicle including an exhaust line.

As shown in FIG. 1, the exhaust line 100 has an exhaust treatment assembly 102 having upstream 104 and downstream 106 ends. The exhaust treatment assembly 102 contains at least one treatment block, such as treatment blocks 138, 140 shown in FIGS. 2 and 3, for treating the exhaust generated by the engine 12. The exhaust line 100 further has at least one inlet pipe and/or inlet piping system 108. The inlet pipe 108 has a first end 110 coupled to and in fluid communication with the engine 12 for receiving the exhaust generated by the engine 12. The inlet pipe 108 further has a second end 112 coupled to the upstream end 104 of the exhaust treatment assembly 102. The inlet pipe 108 is in fluid communication with the exhaust treatment assembly 102 for delivering the exhaust to the exhaust treatment assembly 102 for treating the exhaust. In addition, the exhaust line 100 has at least one outlet pipe and/or outlet piping system 114. The outlet pipe 114 has a first end 116 coupled to the downstream end 106 of the exhaust treatment assembly 102 and in fluid communication with the exhaust treatment assembly 102 for receiving the treated exhaust. The outlet pipe 114 further has a second end 118 that may be open to the atmosphere surrounding the exterior of the vehicle 10 for releasing the treated exhaust to the atmosphere. Alternatively, the outlet pipe 114 could be coupled to a muffler, another exhaust treatment system, and/or the like.

Figure 2:
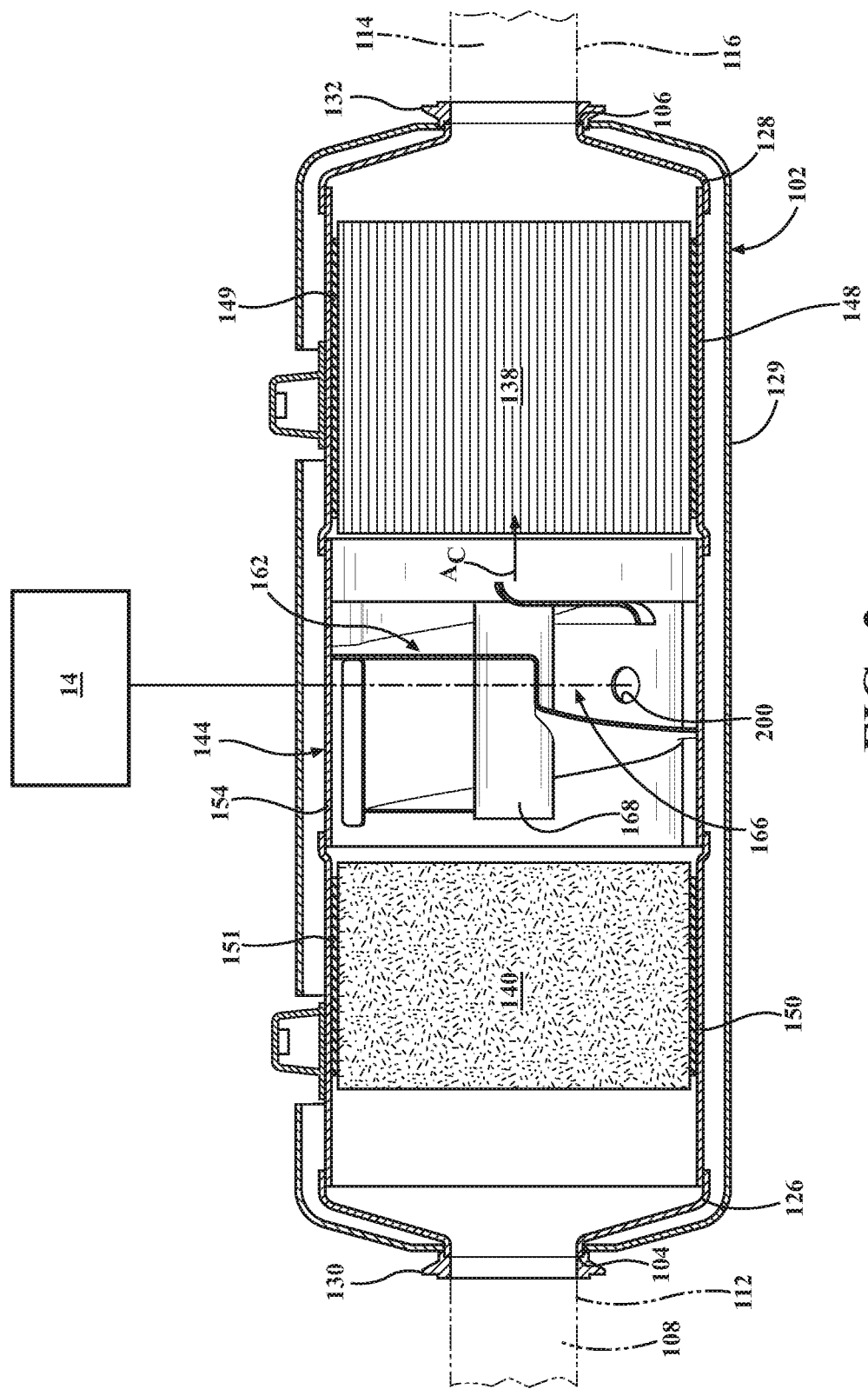
FIG. 2 is a semi-schematic, cross-sectional view of a portion of the exhaust line taken along line 2-2 in FIG. 1.
Figure 3:
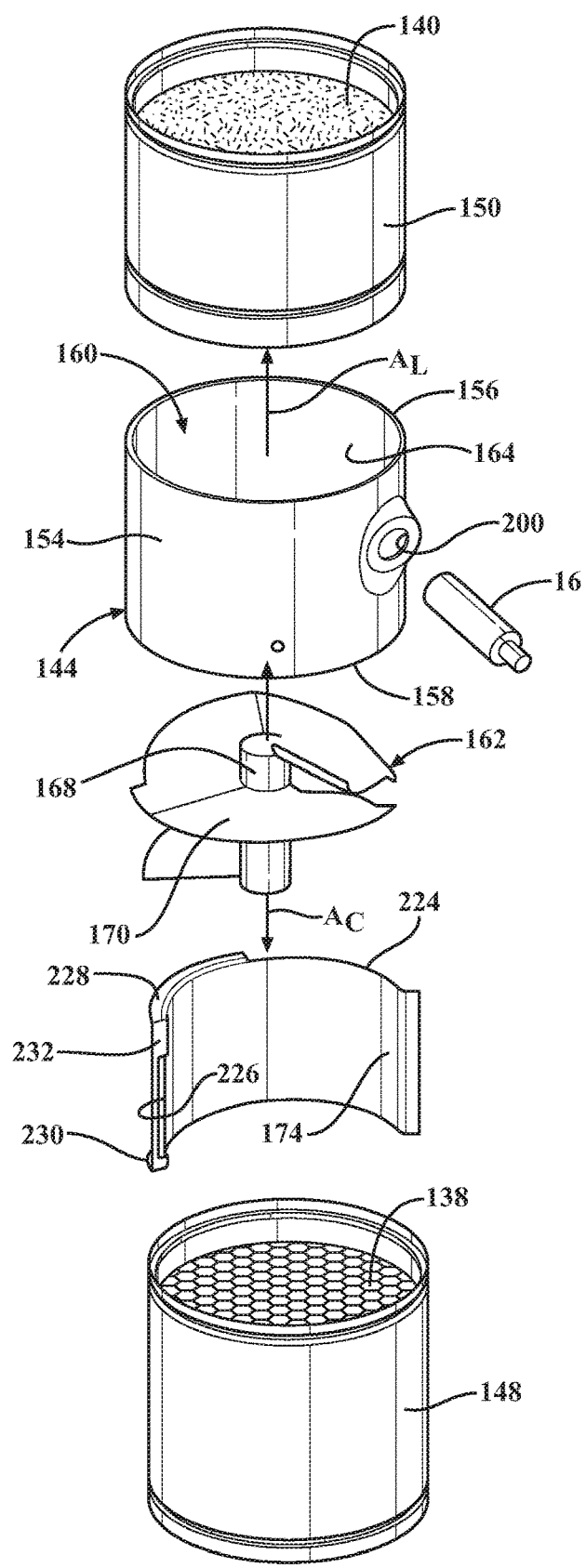
FIG. 3 is an exploded view of a portion of the exhaust line.

Referring to FIGS. 2 and 3, the exhaust treatment assembly 102 includes a plurality of internal exhaust treatment components including, but not limited to, a first treatment block 138, a second treatment block 140, and a mixing housing 144. The first treatment block 138 is disposed in a first treatment housing 148. The first treatment housing 148 may be formed from any suitable material, non-limiting examples of which include metals, metalloids, alloys, and/or combinations thereof. Some specific non-limiting examples of materials for the first treatment housing 148 include ferrous alloys, ferrous alloys coated with aluminum or an aluminum alloy, nickel alloys, titanium alloys, and/or the like. In an embodiment, and as shown in FIG. 2, a mat 149 is disposed at least partially around the first treatment block 138. The mat 149 may be formed from any suitable compressible material. The mat 149 compresses as the first treatment block 138 is disposed within the first treatment housing 148 so that the first treatment block 138 is press-fit inside the first treatment housing 148.

The first treatment block 138 includes a catalyst material for selective catalytic reduction (SCR) of the exhaust generated by the engine 12 of the vehicle 10. The first treatment block 138 may further include a suitable carrier material (such as a ceramic) having any suitable configuration. In one embodiment, the carrier material has a columnar square configuration. In another embodiment, the carrier material has a columnar hexagonal configuration, also known as a honeycomb configuration. In yet another embodiment, the carrier material has a columnar triangular configuration or other suitable configuration. The configuration of the carrier material may be formed by extruding the carrier material into a suitable configuration, such as a honeycomb, columnar square, or columnar triangular shape. Alternatively, the configuration of the carrier material may be formed by coating a honeycomb-shaped, columnar square-shaped, or columnar triangular-shaped substrate with the carrier material.

The catalyst material for the first treatment block 138 is chosen from any catalyst material that can suitably be used for selective catalytic reduction (SCR) of $NO_x$ present in the exhaust. Non-limiting examples of suitable catalyst materials include oxides of metals (such as vanadium, molybdenum, tungsten, iron, copper, and/or the like), zeolites, and/or combinations thereof. Alternatively, the catalyst material may be selected from, but not limited to, an activated carbon.

In an embodiment, the first treatment block 138 may further includes a clean-up catalyst (CUC) material. The CUC material may be selected from any material that can suitably oxidize residual ammonia ($NH_3$) before the treated exhaust is released to the atmosphere surrounding the vehicle 10. In one embodiment, the first treatment block 138 includes a substrate having a honeycomb, columnar square, or columnar triangular configuration and a SCR catalyst material coated on the substrate at an upstream end of the block 138 and a CUC material coated on the substrate at a downstream end of the block 138. Alternatively, the exhaust line 100 could include a separate treatment block containing the CUC catalyst material alone.

In an embodiment, the first treatment block 138 may further include a filter material operable to filter the exhaust generated by the engine 12. The filter material may operate to trap diesel particulate matter or carbon (soot), and convert the trapped particulate matter/soot into carbon dioxide ($CO_2$). This filter material may be referred to as a diesel particulate filter. The filter material may be formed from or include a variety of suitable filter materials, non-limiting examples of which include codierite, silicon carbide, aluminum titanate, sintered metals, and/or combinations thereof.

While the filter material may be part of the first treatment block 138, it is to be appreciated that the filter material may form an independent treatment block, such as a third treatment block, of the exhaust line 100.

As previously mentioned, the exhaust line 100 further includes the second treatment block 140. The second treatment block 140 is disposed in a second treatment housing 150. The second treatment housing 150 may be formed from any suitable material, non-limiting examples of which include metals, metalloids, alloys, and/or combinations thereof. Some specific non-limiting examples of materials for the second treatment housing 150 include ferrous alloys, ferrous alloys coated with aluminum or an aluminum alloy, nickel alloys, titanium alloys, and/or the like. In an embodiment, and as shown in FIG. 2, a mat 151 is disposed at least partially around the second treatment block 140. The mat 151 is formed from any suitable compressible material. The mat 151 compresses as the second treatment block 140 is disposed within the second treatment housing 150 so that the second treatment block 140 is press-fit inside the second treatment housing 150.

The second treatment block 140 includes a catalyst material operable to oxidize pollutants of the exhaust, including carbon monoxide (CO) and hydrocarbons (HC). The catalyst material may be referred to as a diesel oxidation catalyst (DOC). Oxidation of the foregoing exhaust pollutants is typically accomplished utilizing the oxygen already present in the exhaust. The oxidation catalyst of the second treatment block 140 may be formed from a variety of suitable oxidation catalysts, non-limiting examples of which include palladium, platinum, aluminum oxide, and/or combinations thereof.

In the embodiment shown in FIGS. 2 and 3, the exhaust line 100 includes the two treatment blocks 138, 140. Alternatively, the exhaust line 100 could be designed to include three treatment blocks, such as a treatment block containing the SCR catalyst, a treatment block containing a diesel particle filter, and another treatment block containing the DOC catalyst. In another alternative embodiment, the exhaust line 100 could be designed to include a single treatment block.

The exhaust line 100 further has the mixing housing 144. In the embodiment shown in FIGS. 2 and 3, the mixing housing 144 is disposed (or sandwiched) between and connected to the first treatment housing 148 of the first treatment block 138 and the second treatment housing 150 of the second treatment block 140. Connection between the mixing housing 144 and the first treatment housing 148 and connection between the mixing housing 144 and the second treatment housing 150 may be accomplished in any suitable fashion. Details of the mixing housing 144 and the components disposed within the housing 144 are described below at least with reference to FIGS. 2-12.

The exhaust line 100 further has a first cone 126 adjacent the upstream end 104 of the exhaust treatment assembly 102 and a second cone 128 adjacent the downstream end 106 of the exhaust treatment assembly 102. In an embodiment, the first cone 126 is directly attached, such as welded, to the second treatment housing 151 of the second treatment block 140. The second cone 128 is directly attached, such as welded, to the first treatment housing 149 of the first treatment block 138. The exhaust line 100 further has a heat shield or cover 129 surrounding the interconnected first treatment housing 149, the mixing housing 144, and the second treatment housing 151. The heat shield 129 also surrounds the first 126 and second 128 cones. The heat shield 129 may be formed from any material that will suitably absorb, dissipate, or reflect heat, thereby protecting the vehicle 10 and/or surrounding atmosphere from heat emitted from the exhaust.

As shown in FIG. 2, the exhaust line 100 further has a first coupling mechanism 130 directly attached to the first cone 126 for coupling the upstream end 104 of the exhaust treatment assembly 102 to the second end 112 of the inlet pipe 108. The exhaust line 100 further has a second coupling mechanism 132 directly attached to the second cone 128 for coupling the downstream end 106 of the exhaust treatment assembly 102 to the first end 116 of the outlet pipe 114. It is to be appreciated that the exhaust treatment assembly 102 could be coupled to the inlet 108 and outlet 114 pipes utilizing one or more other suitable devices or mechanisms.

In an alternative configuration, the exhaust line 100 could have a single cylindrical shell. The shell would form the mixing housing 144 with the first treatment block 138 disposed within the shell at a downstream end and a second treatment block 140 disposed within the shell at the upstream end.

As shown at least in FIG. 2, the mixing housing 144 defines a port 200. The heat shield 129 defines an opening (not shown). The opening defined in the heat shield 129 is configured to receive a device 16, such as an injector (shown in FIG. 3). The port 200 is in fluid communication with a mixing chamber 166 partially defined by the mixing housing 144, and receives the reducing agent from the device 16 for supplying a reducing agent to the mixing chamber 166 for use during treatment of the exhaust. The reducing agent may be stored onboard the vehicle 12, such as in a storage vessel 14, in liquid form. The device 16 is coupled to the storage vessel 14 utilizing any suitable piping system, and is configured to retrieve the liquid reducing agent, as needed, from the storage vessel 14 during treatment of the exhaust.

Figure 4:
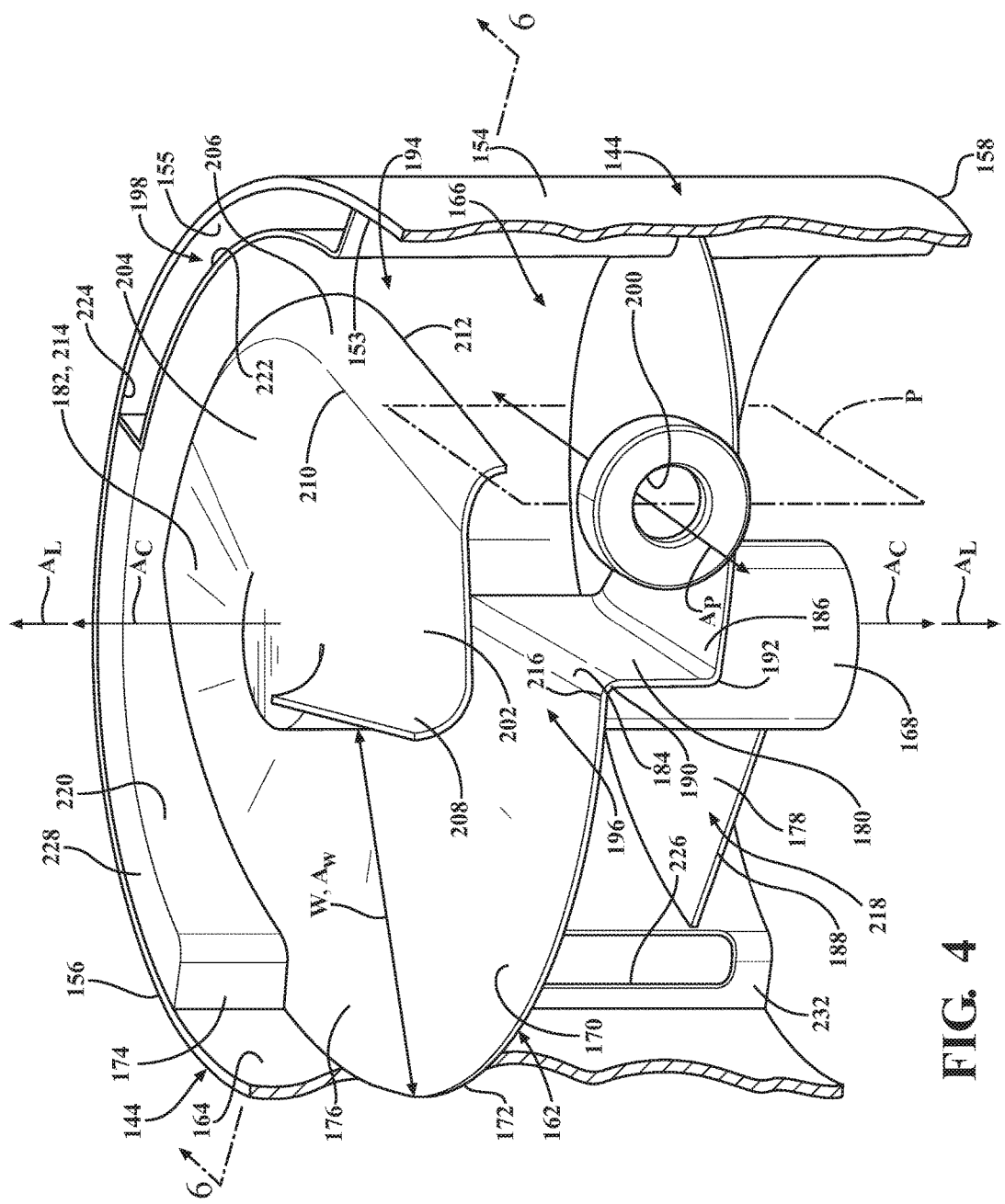
FIG. 4 is a perspective view of a portion of the exhaust line including a portion of a mixing housing and a baffle and a divider disposed within the mixing housing according to an embodiment of the present disclosure.

Details of the mixing housing 144 are described below with reference to FIGS. 2-12. Referring at least to FIGS. 2-4, the mixing housing 144 has a continuous wall 154 defining upstream 156 and downstream 158 ends. As shown in FIGS. 2 and 3, the first treatment block 138 is adjacent the downstream end 158 of the mixing housing 144 for treatment of the exhaust. Additionally, the second treatment block 140 is adjacent the upstream end 156 of the mixing housing 144 for treatment of the exhaust. While the first treatment block 138, the mixing housing 144, and the second treatment block 140 are shown as linearly arranged, this is not required. Alternatively, the first treatment block 138, the mixing housing 144, and the second treatment block 140 could be arranged at an angle from one another. For instance, the first treatment block 138 could be arranged at a 90 degree angle from the mixing housing 144, and the mixing housing 144 could be arranged at a 90 degree angle from the second treatment block 140.

The continuous wall 154 may be formed from a single piece of material into a hollow configuration. In an embodiment, the continuous wall has a substantially cylindrical configuration. Alternatively, the continuous wall 154 may be formed from two or more pieces of material joined to one another (such as by welding) into a hollow configuration. In an embodiment, and as shown at least in FIG. 4, the continuous wall 154 has first 153 and second 155 segments. As shown in FIG. 3, the continuous wall 154 defines an opening 160 extending between the upstream 156 and downstream 158 ends of the wall 154.

The exhaust line 100 further includes a baffle 162 disposed within the mixing housing 144. In an embodiment, the baffle 162 is disposed within the opening 160 of the mixing housing 144, and the baffle 162 is directly attached or mounted (such as welded) to an inner surface 164 of the continuous wall 154.

Referring to FIGS. 2-5, 7, and 8, the baffle 162 defines a center axis $A_C$. The center axis $A_C$ of the baffle 162 is located at the center of the mixing housing 144, and extends between the upstream 156 and downstream 158 ends of the continuous wall 154. In alternative arrangements, the center axis $A_C$ of the baffle 162 could be offset from the center of the mixing housing 144. In addition, the mixing housing 144 defines a longitudinal axis $A_L$ extending between the upstream 156 and downstream 158 ends. The center axis $A_C$ is, in the embodiment shown, parallel to and aligned with the longitudinal axis $A_L$. Accordingly, the baffle 162 is centered relative to the longitudinal axis $A_L$ inside the mixing housing 144. In an alternative arrangement, the center axis $A_C$ could be transverse to the longitudinal axis $A_L$, and the baffle 162 would be tilted inside the mixing housing 144.

The baffle 162 has a post 168 extending along the center axis $A_C$ between the upstream 156 and downstream 158 ends of the wall 154. The post 168 is also aligned with the longitudinal axis $A_L$ of the mixing housing 144. While the post 168 may have any suitable configuration, the post 168 is typically circular. In addition, the post 168 can be solid or hollow, and can have any suitable diameter.

The baffle 162 further has a ramped surface 170. As shown, the ramped surface 170 is coupled to and curves around the post 168 to form a helix. In an embodiment, the ramped surface 170 is directly attached or mounted to the post 168, such as by welding. In another embodiment, the ramped surface 170 is integral with the post 168. The ramped surface 170 extends outwardly from the post 168 toward the continuous wall 154 of the mixing housing 144. The ramped surface 170 has an outer edge 172, and at least a portion of the outer edge 172 is attached or mounted to the continuous wall 154. As shown, the exhaust line 100 further has a divider 174 disposed between the continuous wall 154 and the baffle 162, and a portion of the outer edge 172 of the ramped surface 170 is attached or mounted to the divider 174. Further details of the divider 174 are described below.

As a helix, the ramped surface 170 has a substantially smooth curvature and may have any suitable slope. While the slope of the ramped surface 170 can vary along the length of the ramped surface 170, in an embodiment, the slope is substantially constant (i.e., does not vary) along the length of the ramped surface 170. In addition, and as shown, the ramped surface 170 has a width W defining a width-wise axis $A_W$ that is substantially perpendicular to the center axis $A_C$. The ramped surface 170 also forms at least one complete helical turn and can have any suitable pitch, which is defined by the height of one complete helical turn of the ramped surface 170.

In one embodiment shown in FIGS. 4-8, the ramped surface 170 has first 176 and second 178 ramped portions and a stepped portion 180 interconnecting the first 176 and second 178 ramped portions. The first ramped portion 176 has upstream 182 and downstream 184 ends and the second ramped portion 178 has upstream 186 and downstream 188 ends. The stepped portion 180 of the ramped surface 170 is coupled to the downstream end 184 of the first ramped portion 176 and is coupled to the upstream end 186 of the second ramped portion 178.

Additionally, the stepped portion 180 is transverse to the first 176 and second 178 ramped portions. In an embodiment, the stepped portion 180 is substantially perpendicular to the downstream end 184 of the first ramped portion 176 and is substantially perpendicular to the upstream end 186 of the second ramped portion 178. Alternatively, the stepped portion 180 could be formed at any angle relative to the downstream end 184 of the first ramped portion 176 and the upstream end 186 of the second ramped portion 178. Further, the angle formed between the stepped portion 180 and the first ramped portion 176 can be the same or different than the angle formed between the stepped portion 180 and the second ramped portion 178. In an embodiment, the stepped portion 180 is integral with the downstream end 184 of the first ramped portion 176 and the upstream end 186 of the second ramped portion 178. In another embodiment, the ramped surface 172 is formed from a single piece of material, and the stepped portion 180 is formed by a first bend 190 of the single piece of material at the downstream end 184 of the first ramped portion 176 and a second bend 192 of the single piece of material at the upstream end 186 of the second ramped portion 178. Each of the first 190 and second 192 bends may be a 90 degree bend. Alternatively, the first 190 and second 192 bends can be formed at any desired angle, such as an angle greater or less than 90 degrees.

The first portion 176 of the ramped surface 170 is positioned adjacent the upstream end 156 of the mixing housing 144, and the second portion 178 of the ramped surface 170 is positioned adjacent the downstream end 158 of the mixing housing 144. The baffle 162 and the divider 174 further define a chamber outlet 218 at the downstream end 158 of the mixing housing 144 for releasing the exhaust and the reducing agent. In the embodiment shown, the second portion 178 of the ramped surface 170 and the divider 174 defines the chamber outlet 218 at the downstream end 158 of the mixing housing 144.

Each of the first 176 and second 178 ramped portions is coupled to and curves around the post 168 to form a helix, and each of the first 176 and second 178 ramped portions has a substantially smooth curvature. In addition, the slopes of the first 176 and second 178 ramped portions can be the same or different, and the pitch of the first 176 and second 178 ramped portions can be the same or different. In the embodiment shown, the first ramped portion 176 has substantially the same pitch as the second ramped portion 178. In addition, each of the first 176 and second 178 ramped portions may have any length. In an embodiment, the length of each of the first 176 and second 178 ramped portions is such that each of the first 176 and second 178 ramped portions forms less than one complete revolution of the helix. In an example, the length of each of the first 176 and second 178 ramped portions is such that each of the first 176 and second 178 ramped portions forms more than one half, but less than one complete revolution of the helix.

As best shown in FIG. 3, the continuous wall 154 of the mixing housing 144 further defines a port 200 for receiving the reducing agent from the device 16. As shown, the port 200 is in fluid communication with a mixing chamber 166 partially defined by the baffle 162 and the continuous wall 154 of the mixing housing 144. The port 200 enables passage of the reducing agent from the device 16 into a mixing chamber 166. As shown at least in FIG. 4, the port 200 defines a port axis $A_P$ extending transverse to the center axis $A_C$. The port axis $A_P$ defines a plane P extending through the mixing chamber 166 between the upstream 156 and downstream 158 ends of the mixing housing 144.

As mentioned above, the baffle 162 and a portion of the continuous wall 144 defines the mixing chamber 166 for mixing the exhaust and the reducing agent. The mixing chamber 166 is defined below the ramped surface 170 (the helix) and between the center axis $A_C$ and at least the portion of the continuous wall 154. In embodiments where the exhaust line 100 has the divider 174, the baffle 162, a portion of the continuous wall 154, and the divider 174 define the mixing chamber 166.

The mixing chamber 166 may be as large or as small as desired so long as there is ample room for mixing the exhaust with the reducing agent. In an embodiment, the height of the mixing chamber 166 is equal to the distance between the first 176 and second 178 ramped surfaces. In other words, the height of the mixing chamber 166 is equal to the pitch of the ramped surface 170. The width of the mixing chamber 166 is equal to the width W of the ramped surface 170. Details of the mixing of the exhaust and the reducing agent that takes place inside the mixing chamber 166 are described below.

Figure 5:
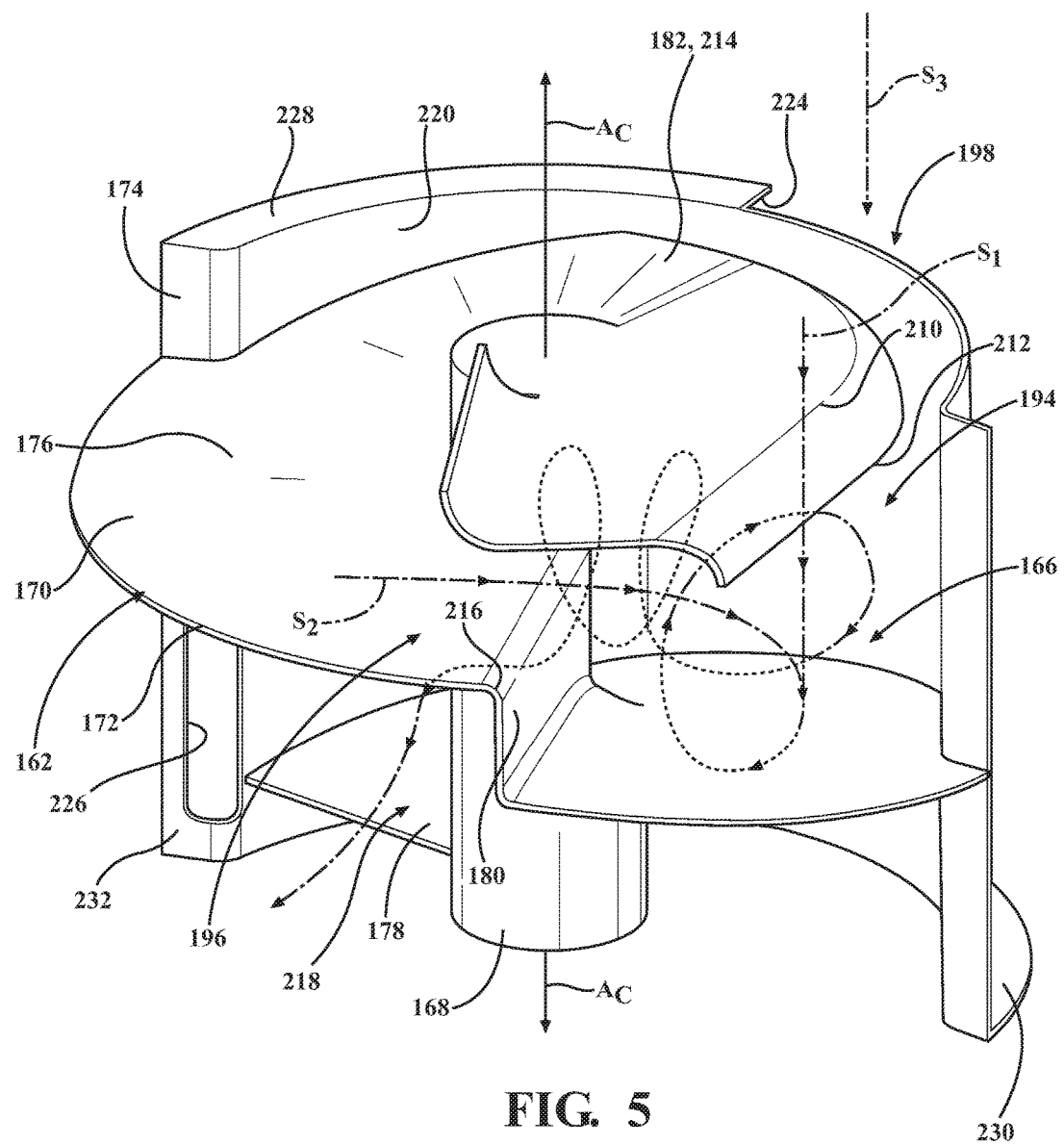
FIG. 5 is a perspective view of a portion of the exhaust line illustrating the baffle and the divider of FIG. 4 with arrows depicting respective flow directions of portions of an exhaust generated by an engine of the vehicle.
Figure 6:
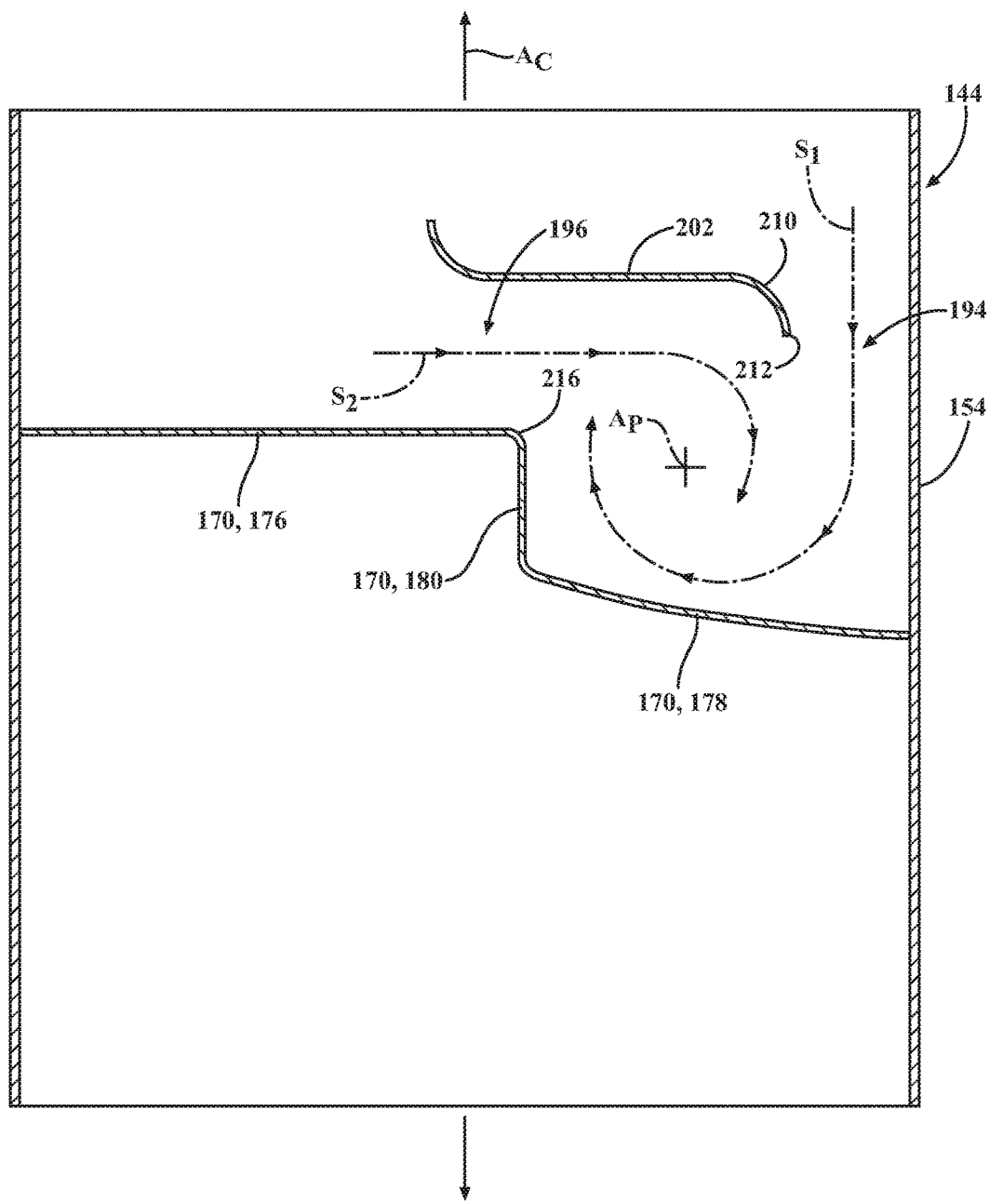
FIG. 6 is a cross sectional view of the portion of the exhaust line taken along line 6-6 of FIG. 4.
Figure 7:
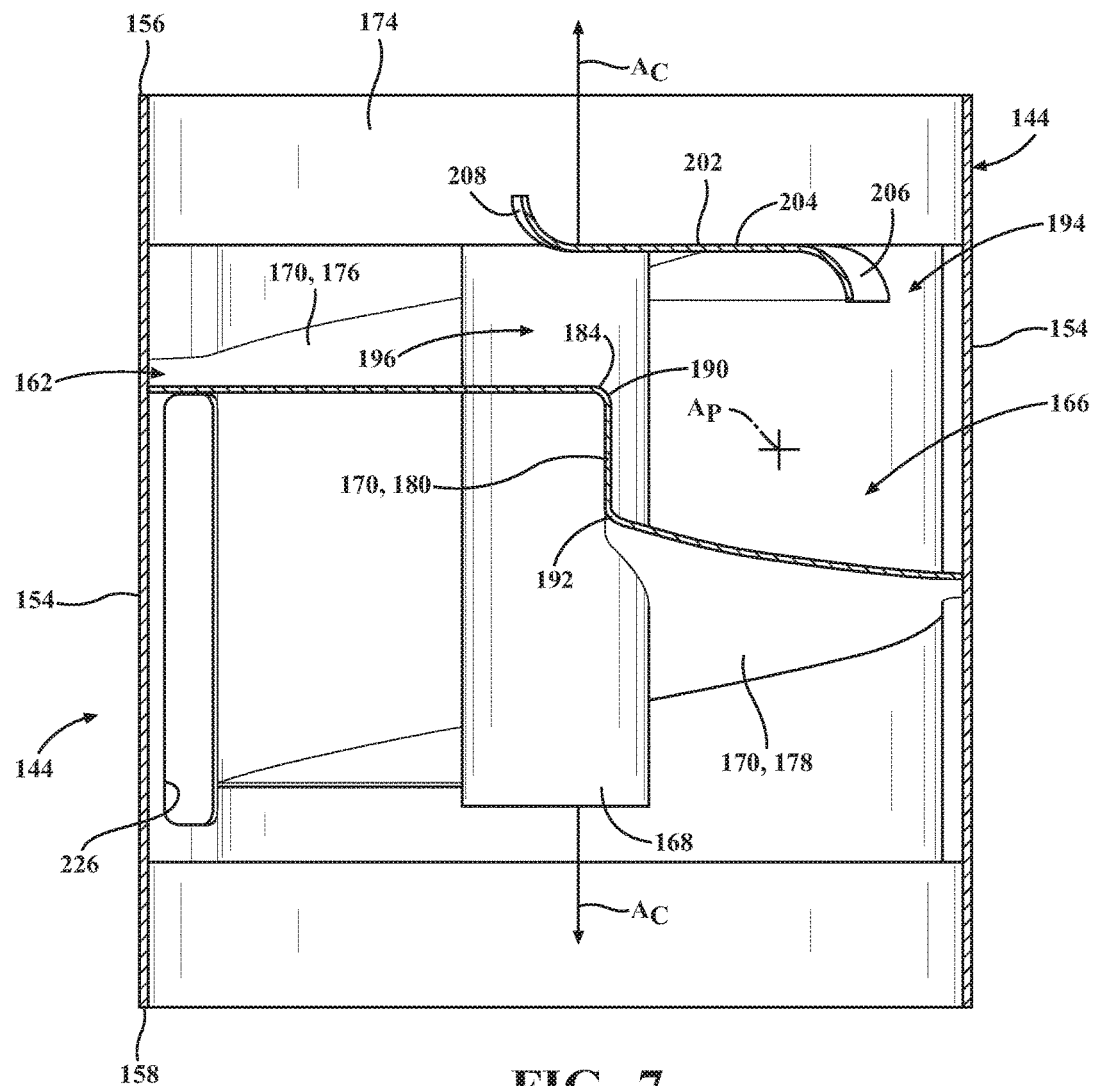
FIG. 7 is a cross sectional view of the portion of the exhaust line taken along line 7-7 of FIG. 8.
Figure 8:
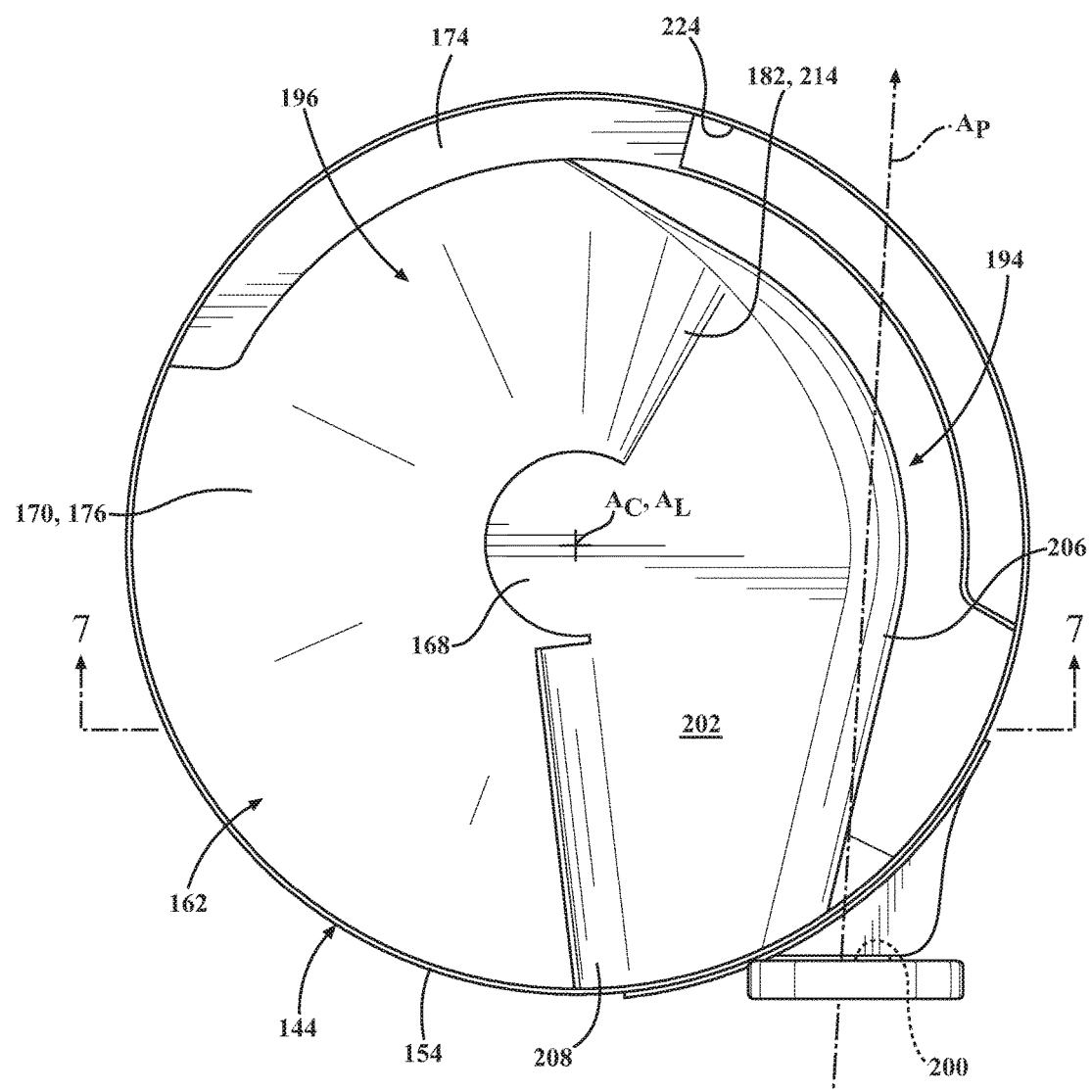
FIG. 8 is a top plan view of the portion of the exhaust line of FIG. 4.

The baffle 162 further has a first flange 202 partially defining a first exhaust inlet 210 and a first exhaust exit 212 offset from the center axis $A_C$. This is best shown in FIG. 6. In another embodiment, and with reference to FIG. 5, the first exhaust inlet 210 and the first exhaust exit 212 are defined by the first flange 202, the divider 174, and the wall 154 of the mixing housing 144. The first exhaust inlet 210 and the first exhaust exit 212 define a first passageway 194 for delivering a portion of the exhaust to the mixing chamber 166. The first passageway 194 defined by the first exhaust inlet 210 and the first exhaust exit 212 extends in a direction substantially parallel to and offset from the center axis $A_C$. In addition, and as shown in FIG. 4, the first passageway 194 extends between the continuous wall 154 of the mixing housing 144 and the plane P defined by the port axis $A_P$.

The first flange 202 extends from the upstream end 182 of the first ramped portion 176. In an embodiment, the first flange 202 is integral with the first ramped portion 176. In addition, the first flange 202 extends from the post 168. In an embodiment, the first flange 202 is integral with the post 168. In another embodiment, the first flange 202 covers and is attached to the post 168, similar to a cap.

The first flange 202 has a flat portion 204 that is substantially perpendicular to the center axis $A_C$. The flat portion 204, with is attached to or integral with the post 168, curves around and extends outwardly from the post 168 toward the divider 174 and the continuous wall 154. The first flange 202 further has first 206 and second 208 lips. The first lip 206 is adjacent the divider 174 and the wall 154, and extends from the flat portion 204 and curves in a direction toward the downstream end 158 of the mixing housing 144. As shown, the first lip 206 is spaced from the divider 174 and the wall 154, and partially defines the first exhaust inlet 210 and the first exhaust exit 212 of the first passageway 194. The second lip 208 is formed adjacent the post 168, and extends from the flat portion 204 and curves in a direction toward the upstream end 156 of the mixing housing 144. The second lip 208 operates to direct exhaust toward the second passageway 196, which is described in further detail below.

The ramped surface 170 further defines a second exhaust inlet 214 and a second exhaust exit 216 offset from the center axis $A_C$ with the second exhaust inlet 214 and the second exhaust exit 216 defining a second passageway 196 for delivering another portion of the exhaust to the mixing chamber 166. This is best shown in FIG. 6. In another embodiment, and with reference to FIG. 5, the second exhaust inlet 212 is defined by the ramped surface 170, the divider 174, and the post 168. The second exhaust exit 216 is defined by the ramped surface 170, the first flange 202, the continuous wall 154, and the post 168, and is located at an upper end (i.e., the end closer to the upstream end 156 of the mixing housing 144) of the mixing chamber 166. The second passageway 196 follows the ramped surface 170 between the upstream 182 and downstream 184 ends of the first ramped portion 176. In addition, the second passageway 196 at the second exhaust exit 216 extends in a direction transverse to the first passageway 194. As shown in FIG. 4, the first exhaust exit 212 of the first passageway 194 is located at one side of the plane P defined by the port axis $A_P$, and the second exhaust exit 216 of the second passageway 196 is located at another side of the plane P defined by the port axis $A_P$.

When generated, the exhaust is delivered to the exhaust tube 102 by the inlet pipe/piping system 108 as mentioned above. After flowing through the second treatment block 140, the exhaust enters the mixing housing 144 at the upstream end 156. As shown in FIGS. 5 and 6, the exhaust splits into multiple exhaust streams. One of the exhaust streams $S_1$ flows toward the first passageway 194, and another one of the exhaust streams $S_2$ flows toward the second passageway 196. As will be described in further detail below, another exhaust stream $S_3$ flows toward a bypass chamber 198 partially defined by the divider 174.

The exhaust stream $S_1$ flows through the first passageway 194 in a direction substantially parallel to the center axis $A_C$ and into the mixing chamber 166. The exhaust stream $S_2$ flows through the second passageway 196 in a direction transverse to the center axis $A_C$ and into the mixing chamber 166. Inside the mixing chamber 166, the streams $S_1$, $S_2$ intersect to form a vortex. With the second exhaust exit 216 located at the upper end of the mixing chamber 166 and the first 212 and second 216 exhaust exits located at opposite sides of the plane P defined by the port axis $A_P$, the exhaust stream $S_2$ intersects the exhaust stream $S_1$ between the plane P defined by the post axis $A_P$ and the divider 174/wall 154 inside the mixing chamber 166 to form a vortex that swirls in a clockwise direction.

Another embodiment of the baffle 362 is described below with reference to FIGS. 9-11. Similar to the baffle 162 described above, the baffle 362 in this embodiment is disposed within the opening 160 of the mixing housing 144 and is directly attached or mounted (such as welded) to the inner surface 164 of the continuous wall 154.

The baffle 362 defines the center axis $A_C$, which is located at the center of the mixing housing 144 and extends between the upstream 156 and downstream 158 ends of the wall 154. In alternative arrangements, the center axis $A_C$ of the baffle 362 could be offset from the center of the mixing housing 144. In addition, the center axis $A_C$ is, in this embodiment, parallel to and aligned with the longitudinal axis $A_L$ of the mixing housing 144. With this arrangement, the baffle 362 is centered relative to the longitudinal axis $A_L$ inside the mixing housing 144. In an alternative arrangement, the center axis $A_C$ could be transverse to the longitudinal axis $A_L$, and the baffle 362 would be tilted inside the mixing housing 144.

Figure 9:
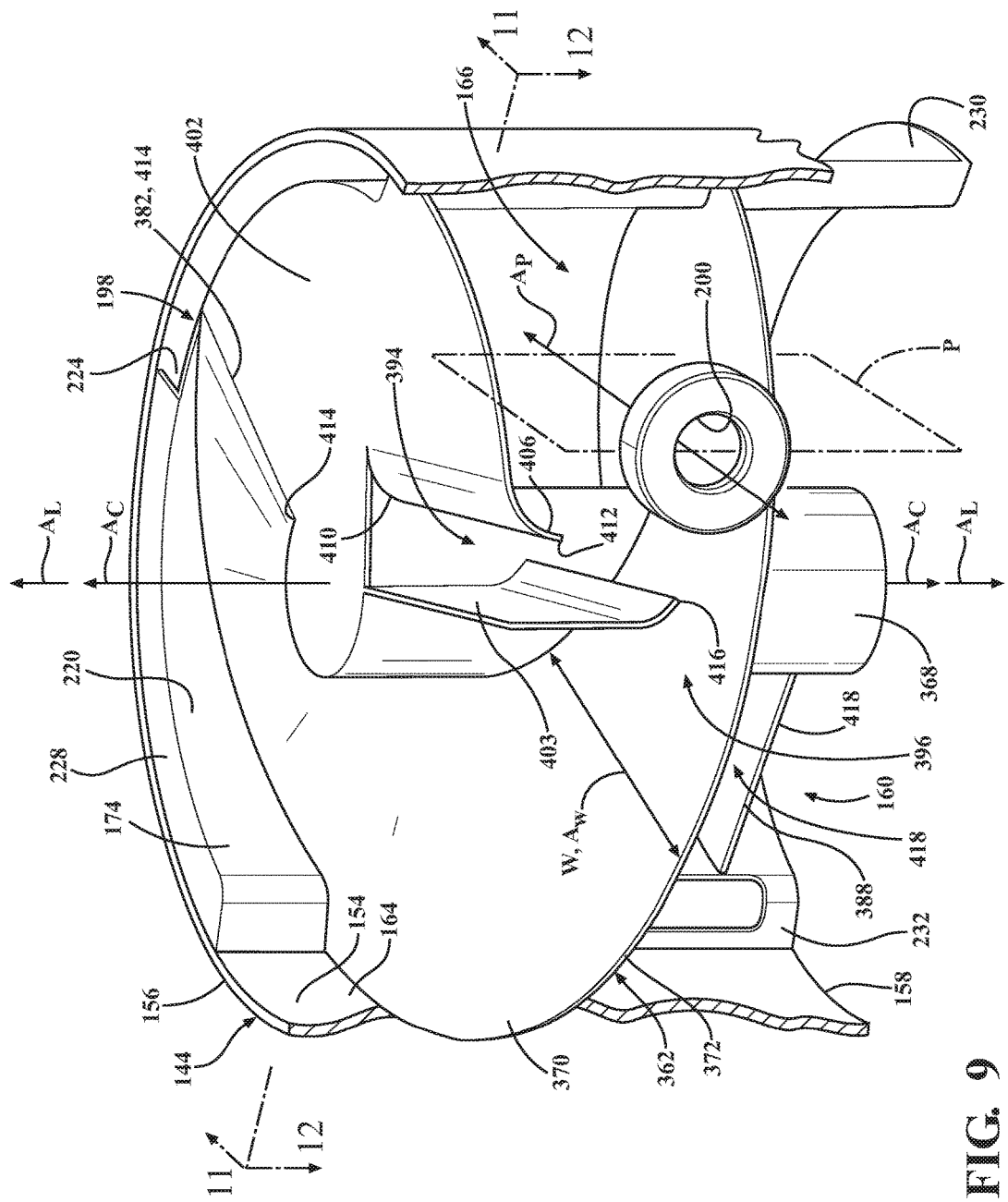
FIG. 9 is a perspective view of a portion of an exhaust line including a portion of a mixing housing and a baffle and a divider disposed within the mixing housing according to another embodiment of the present disclosure.
Figure 10:
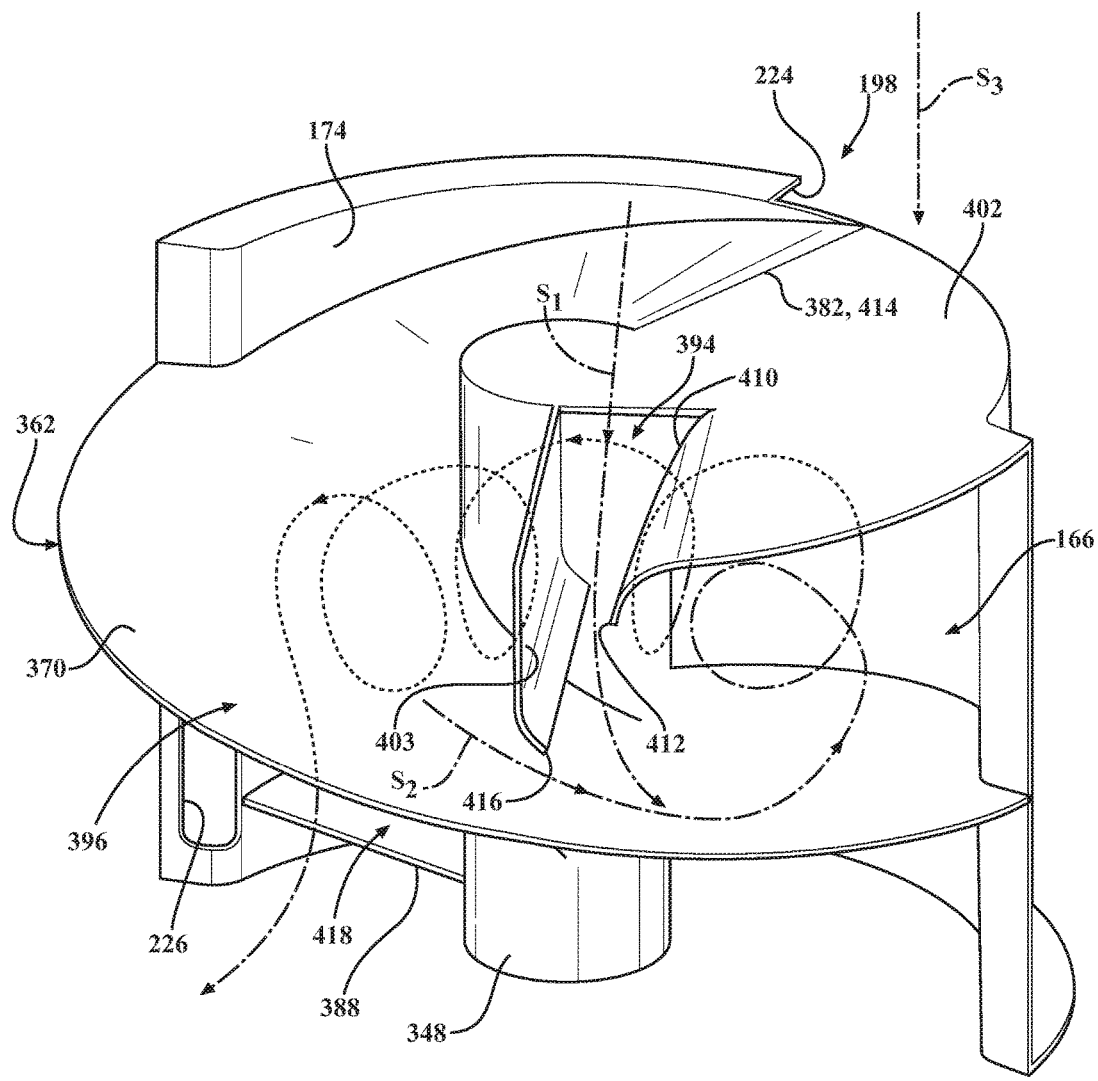
FIG. 10 is a perspective view of a portion of the exhaust line including the baffle and the divider of FIG. 9 with arrows depicting the respective flow directions of portions of the exhaust generated by the engine of the vehicle.

As shown in FIGS. 9 and 10, the baffle 362 has a post 368 extending along the center axis $A_C$ between the upstream 156 and downstream 158 ends of the wall 154. The post 368 is also aligned with the longitudinal axis $A_L$ of the mixing housing 144. While the post 368 may have any suitable configuration, the post 368 is typically circular. In addition, the post 368 can be solid or hollow, and can have any suitable diameter.

The baffle 362 further has a ramped surface 370. As shown, the ramped surface 370 is coupled to and curves around the post 368 to form a helix. In an embodiment, the ramped surface 370 is directly attached or mounted to the post 368, such as by welding. In another embodiment, the ramped surface 370 is integral with the post 368. The ramped surface 370 extends outwardly from the post 368 toward the continuous wall 154 of the mixing housing 144. The ramped surface 370 has an outer edge 372, and at least a portion of the outer edge 372 is attached or mounted to the continuous wall 154. In addition, a portion of the outer edge 372 of the ramped surface 370 is also attached or mounted to the divider 174.

As a helix, the ramped surface 370 has a substantially smooth curvature and may have any suitable slope. While the slope of the ramped surface 370 can vary along the length of the ramped surface 370, in the embodiment shown, the slope is substantially constant (i.e., does not vary) along the length of the ramped surface 370. In addition, and as shown, the ramped surface 370 has a width W defining a width-wise axis $A_W$ that is substantially perpendicular to the center axis $A_C$. The ramped surface 370 also forms at least one complete helical turn. In the embodiment shown in FIGS. 9 and 10, the ramped surface 370 forms more than one complete helical turn and can have any suitable pitch, which is defined by the height of one complete helical turn of the ramped surface 370.

Figure 11:
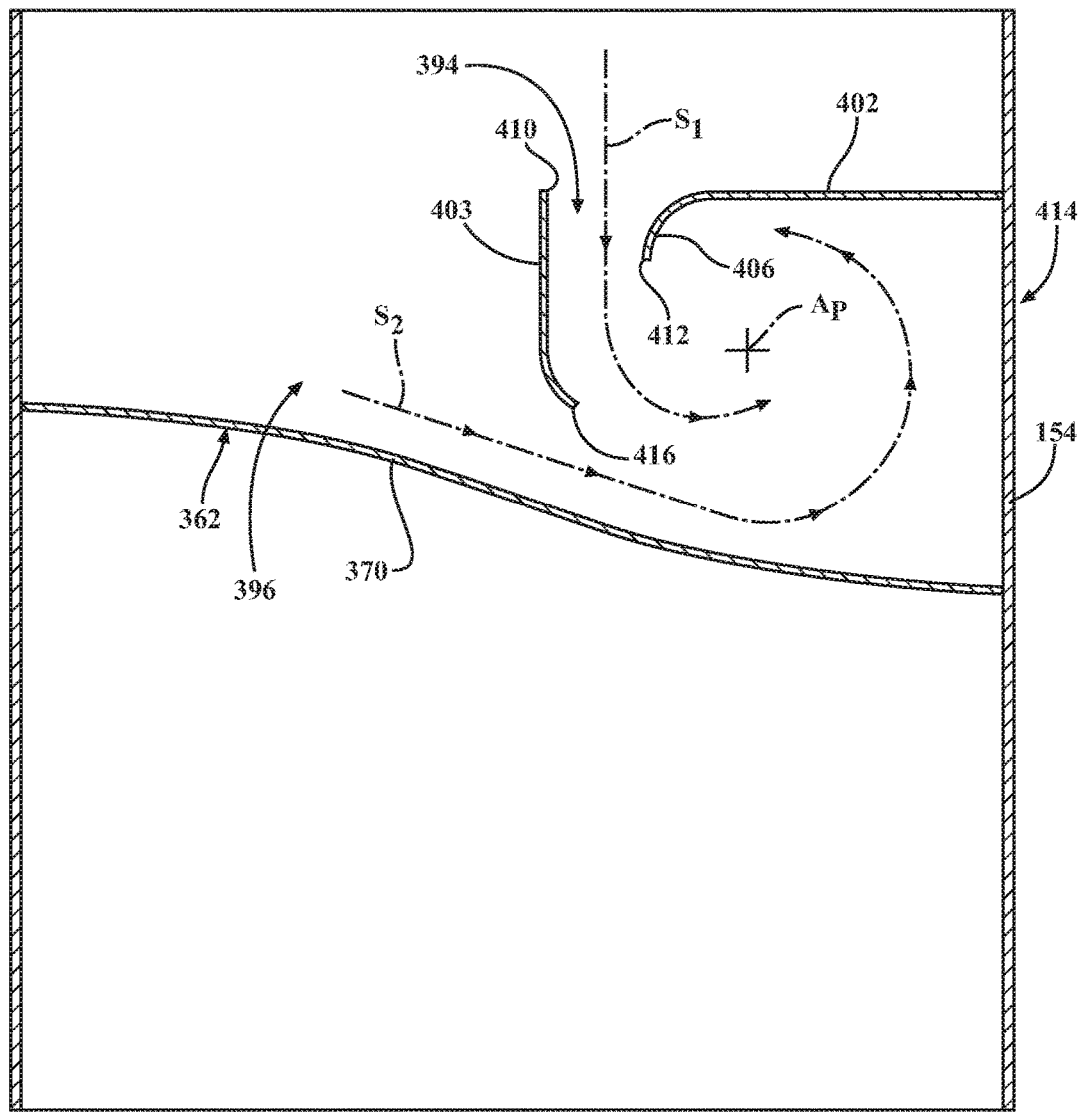
FIG. 11 is a cross sectional view of the portion of the exhaust line taken along line 11-11 of FIG. 9.

In one embodiment shown in FIGS. 9-11, the ramped surface 370 has an upstream end 382 and a downstream end 388. The upstream end 382 of the ramped surface 370 is adjacent the upstream end 156 of the mixing housing 144, and the downstream end 388 of the ramped surface 370 is adjacent the downstream end 158 of the mixing housing 144. The ramped surface 370 partially defines the chamber outlet 418 at the downstream end 388, which is adjacent the downstream end 158 of the mixing housing 144. In the embodiment shown in FIGS. 9-11, the ramped surface 370 is continuous from upstream end 382 (the second exhaust inlet 414, described below) to the chamber outlet 418.

The continuous wall 154 of the mixing housing 144 further defines the port 200 for receiving the reducing agent from the device 16, as shown in FIG. 3. The port 200 is in fluid communication with the mixing chamber 166, and enables passage of the reducing agent from the device 16 into the mixing chamber 166. As shown in FIG. 9, the port 100 defines the port axis $A_P$ extending transverse to the center axis $A_C$. The port axis $A_P$ defines the plane P extending through the mixing chamber 166 and between the upstream 156 and downstream 158 ends of the mixing housing 144.

The baffle 362 and at least a portion of the continuous wall 154 defines the mixing chamber 166 for mixing the exhaust and the reducing agent. Similar to the embodiment described above with reference to FIGS. 4-8, the mixing chamber 166 is defined below the helix and between the center axis $A_C$ and at least the portion of the continuous wall 154. In embodiments where the exhaust line 100 has the divider 174, the baffle 362, a portion of the continuous wall 154, and the divider 174 define the mixing chamber 166. The mixing chamber 166 may be as large or as small as desired. In the embodiment shown in FIGS. 9-11, however, the height of the mixing chamber 166 is equal to the pitch of the ramped surface 370.

The baffle 362 further has a first flange 402 partially defining a first exhaust inlet 410 and a first exhaust exit 412 offset from the center axis $A_C$. In the embodiment shown in FIGS. 9-11, the baffle 362 further has a second flange 403 extending from the post 368. The first flange 402, the second flange 403, the continuous wall 154 of the mixing housing 144, and the post 368 define first exhaust inlet 410 and the first exhaust exit 412.

The first exhaust inlet 410 and the first exhaust exit 412 define a first passageway 394 for delivering a portion of the exhaust to the mixing chamber 166. The first passageway 394 defined by the first exhaust inlet 410 and the first exhaust exit 412 extends in a direction substantially parallel to and offset from the center axis $A_C$. In addition, and as shown in FIG. 9, the first passageway 394 extends between the center axis $A_C$ and the plane P defined by the port axis $A_P$.

The first flange 402 extends from and the upstream end 382 of the ramped surface 370. In an embodiment, the first flange 402 is integral with the ramped surface 370. In addition, the first flange 402 extends from the post 368. In an embodiment first flange 402 is integral with the post 368. In another embodiment, the first flange 402 covers and is attached to the post 168, similar to a cap.

The first flange 402 has a flat portion 404 that is substantially perpendicular to the center axis $A_C$. The flat portion 404, which is attached to or integral with the post 368, curves around and extends outwardly from the post 368 toward the divider 174 and the continuous wall 154. In the embodiment shown in FIGS. 9-11, the first flange 402 further has a lip 406 extending from the flat portion 404 adjacent the post 368. The lip 406 curves in a direction toward the downstream end 158 of the mixing housing 144. As shown, the lip 406 partially defines the first exhaust inlet 410 and the first exhaust exit 412 of the first passageway 394.

The ramped surface 370 further defines a second exhaust inlet 414 and a second exhaust exit 416 offset from the center axis $A_C$ with the second exhaust inlet 414 and the second exhaust exit 416 defining a second passageway 396 for delivering another portion of the exhaust to the mixing chamber 166. In another embodiment, the second exhaust inlet 412 is defined by the ramped surface 370, the divider 174, and the post 368. The second exhaust exit 416 is defined by the ramped surface 370, the second flange 403, the continuous wall 154 of the mixing housing 144, and the post 368. As shown in FIGS. 9-11, the second exhaust exit 416 is located at a lower end (i.e., the end closer to the downstream end 158 of the mixing housing 144) of the mixing chamber 166. The second passageway 396 follows the ramped surface 370 between the upstream 382 and downstream 388 ends of the ramped surface 370. In addition, the second passageway 396 at the second exhaust exit 416 extends in a direction transverse to the first passageway 394. As shown at least in FIG. 9, the first exhaust exit 412 of the first passageway 394 is located at one side of the plane P defined by the port axis $A_P$, and the second exhaust exit 416 of the second passageway 396 is located at the same side of the plane P. In other words, the first 412 and second 416 exhaust exits are located at the same side of the plane P defined by the port axis $A_P$.

As previously mentioned, the exhaust splits into multiple streams when the exhaust enters the mixing housing 144. One of the exhaust streams $S_1$ flows toward the first passageway 394, and another one of the exhaust streams $S_2$ flows toward the second passageway 396. The exhaust also splits into another exhaust stream $S_3$, which flows toward the bypass chamber 198 described in further detail below.

As shown in FIGS. 10 and 11, the exhaust stream $S_1$ flows through the first passageway 394 in a direction substantially parallel to the center axis $A_C$ and into the mixing chamber 166. The exhaust stream $S_2$ flows through the second passageway 396 in a direction transverse to the center axis $A_C$ and into the mixing chamber 166. Inside the mixing chamber 166, the streams $S_1$, $S_2$ intersect to form a vortex. With the second exhaust exit 416 located at the lower end of the mixing chamber 166 and the first 412 and second 416 exhaust exits located between center axis $A_C$ and the plane P defined by the port axis $A_P$, the exhaust stream $S_2$ intersects the exhaust stream $S_1$ between the center axis $A_C$ and the plane P inside the mixing chamber 166 to form a vortex that swirls in a counter-clockwise direction.

As mentioned above, the device 16 operates to inject the reducing agent into the mixing chamber 166. The reducing agent and the exhaust streams $S_1$ and $S_2$ intersect to form the vortex (whether clockwise or counter-clockwise depending on the configuration of the baffle 162, 362) inside the mixing chamber 166. The reducing agent may be any suitable diesel exhaust fluid. In an embodiment, the reducing agent is a diesel exhaust fluid capable of forming or decomposing into ammonia for subsequent use during selective catalytic reduction of nitrogen oxides ($NO_x$) present in the exhaust. In an embodiment, the reducing agent is an aqueous solution containing urea (($NH_2$)$_2$CO). When the reducing agent is introduced, such as injected or sprayed, into the mixing chamber 166 and mixes with the exhaust, the urea decomposes into ammonia ($NH_3$) and isocyanic acid (HNCO), as shown in Reaction 1 below:

$$(NH_2)_2CO \rightarrow NH_3 + HNCO \quad \text{(Reaction 1)}.$$

Utilizing the water vapor present in the exhaust, the isocyanic acid hydrolyses to carbon dioxide ($CO_2$) and ammonia ($NH_3$), as shown in Reaction 2 below:

$$HNCO + H_2O \rightarrow CO_2 + NH_3 \quad \text{(Reaction 2)}.$$

The mixture containing the exhaust, carbon dioxide, ammonia, and any unreacted urea continue to swirl as the mixture flows through the mixing chamber 166 toward the chamber outlet 218, 418. Due, at least in part, to the swirling action inside the mixing chamber 166, the unreacted urea decomposes as the mixture flows toward the chamber outlet 218, 418.

Figure 12:
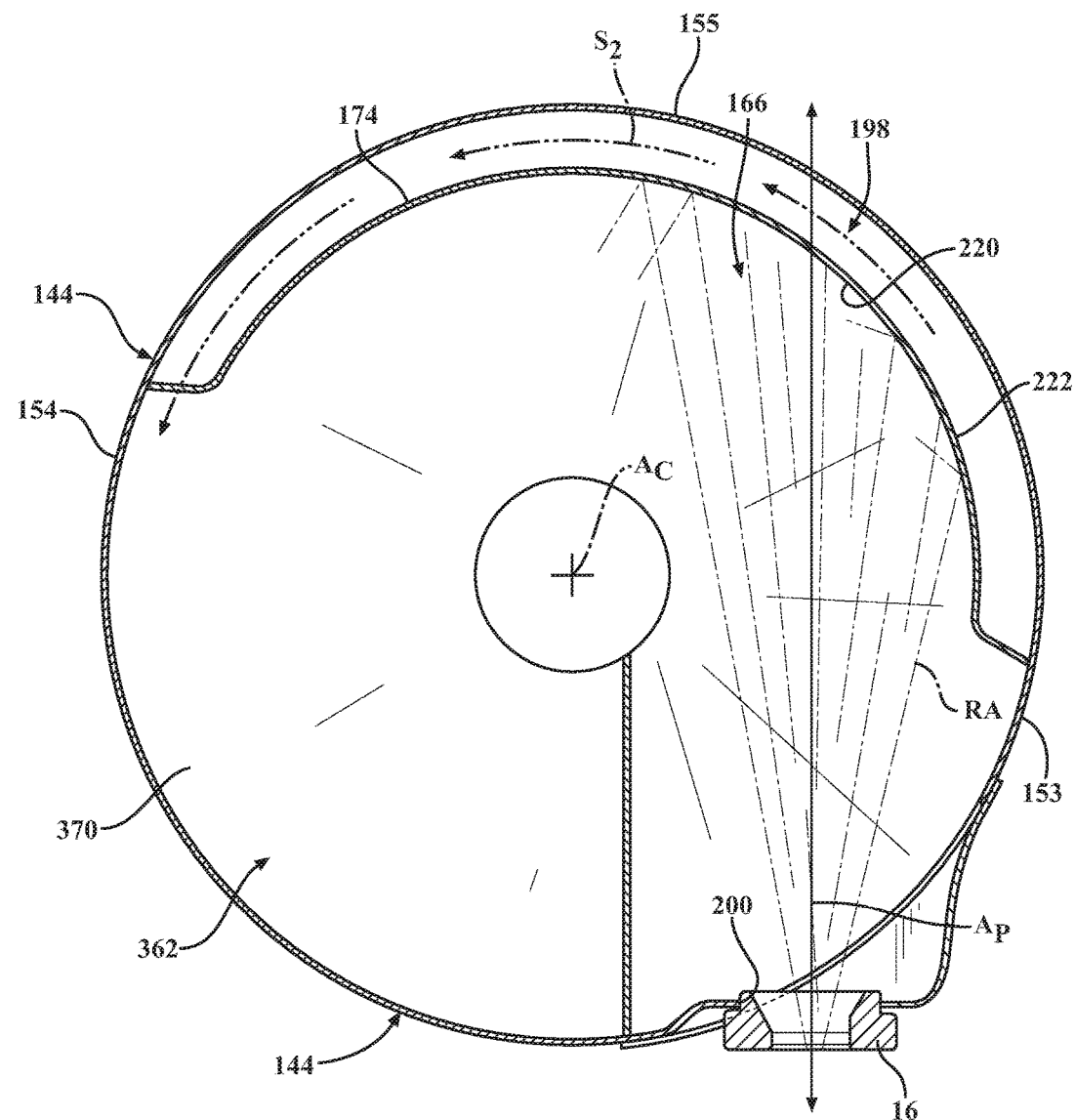
FIG. 12 is a top cross-sectional view of the portion of the exhaust line taken along line 12-12 of FIG. 9.

FIG. 12 illustrates the trajectory of the reducing agent (identified by RA in the figure) introduced into the mixing chamber 166 of the mixing housing 144. From the device 16, such as a nozzle of an injector, the reducing agent is sprayed into the mixing chamber 166 in a direction toward the continuous wall 154 of the mixing housing 144 opposite the device 16. Notably, the spray direction of the reducing agent is transverse to the exhaust streams $S_1$, $S_2$ flowing into the mixing chamber 166 from the first 194, 394 and second 196, 396 passageways, respectively. By interaction with the hot exhaust inside the mixing chamber 166, the reducing agent remains above its crystallization temperature and is in proper form for reaction with the exhaust to produce ammonia. However, upon contacting the divider 174 (which is disposed between the continuous wall 154 and the baffle 162, 362), the reducing agent cools (due to evaporation of the reducing agent upon contacting the divider 174) to a temperature below its crystallization temperature. At this lower temperature, the active component of the reducing agent (such as the urea) tends to crystallize. In this form, the active component (urea) cannot suitably decompose and produce the ammonia needed for subsequent treatment (selective catalytic reduction) of the exhaust.

By heating selected portions of the divider 174, the heat from the divider 174 can be transferred to the reducing agent in contact with the divider 174 to keep the reducing agent at a temperature above its crystallization temperature. In doing so, the reducing agent does not crystallize and remains in proper physical form for reaction with component(s) of the exhaust to produce ammonia.

As previously mentioned, the divider 174 is disposed between the continuous wall 154 of the mixing housing 144 and the baffle 162, 362. As shown, the continuous wall 154 has a circumference C, and the divider 174 extends along less than half of the circumference C of the wall 154. In addition, the divider 174 has first 220 and second 222 surfaces. In an embodiment, the first surface 220 of the divider 174, the first segment 153 of the continuous wall 154, and the baffle 162, 362 defines the mixing chamber 166 in fluid communication with the upstream end 156 of the mixing housing 144 for receiving a portion of the exhaust (exhaust stream $S_1$). The second surface 222 of the divider 174 faces the second segment 155 of the continuous wall 154 and defines the bypass chamber 198 adjacent the mixing chamber 166. As described in further detail below, the bypass chamber 198 is operable to transfer heat from another portion of the exhaust passing through the bypass chamber 198 to the reducing agent inside the mixing chamber 166 for effective treatment of the exhaust.

With reference at least to FIGS. 4, 5, 8-10, and 12, the divider 174 defines a bypass inlet 224 facing the upstream end 156 of the mixing housing 144 for receiving another portion of the exhaust. In the embodiment shown, the divider 174 has a first lip 228 adjacent the upstream end 156 of the continuous wall 154 and extending toward the second segment 155 of the continuous wall 154 with the first lip 228 defining the bypass inlet 224 at the upstream end 156 for receiving the other portion of the exhaust (exhaust stream $S_3$). In another embodiment, the divider 174 (such as the first lip 228) and the second segment 155 of the continuous wall 154 defines the bypass inlet 224. In the embodiment shown, the bypass inlet 224 has a substantially rectangular curved configuration extending partially along a length of the first lip 228 that follows the curvature of the continuous wall 154 and the divider 174. Alternatively, the bypass inlet 224 could have an oval configuration, a circular configuration, and/or any other configuration or size that will suitably enable the other portion of the exhaust (such as exhaust stream $S_3$) to enter the bypass chamber 198 through the bypass inlet 224.

The divider 174 further defines a bypass outlet 226 facing the downstream end 158 for releasing the other portion of the exhaust (exhaust stream $S_3$). In an embodiment, the divider 174 has second 230 and third 232 lips with the second lip 230 adjacent the downstream end 158 of the continuous wall 154 and the third lip 232 between the first 228 and second 230 lips and each of the second 230 and third 232 lips extending toward the second segment 155 of the continuous wall 154. The second 230 and third 232 lips define the bypass outlet 226 adjacent the downstream end 158 for releasing the other portion of the exhaust (exhaust stream $S_3$). The bypass outlet 226 is also adjacent the chamber outlet 218, 418 for enabling the other portion of the exhaust (exhaust stream $S_3$) to merge with the portion of the exhaust (exhaust streams $S_1$, $S_2$) and the reducing agent. In the embodiment shown, the bypass outlet 226 has a substantially rectangular curved configuration and extends partially along a length of the third lip 232. Alternatively, the bypass inlet 224 could have an oval configuration, a circular configuration, and/or any other configuration or size that will suitably enable the other portion of the exhaust (such as exhaust stream $S_3$) to exit the bypass chamber 198 through the bypass outlet 226.

As previously described, the exhaust enters the mixing housing 144 though the upstream end 156 and splits into multiple exhaust streams. One of the exhaust streams $S_1$ flows into the first passageway 194, 394 and into the mixing chamber 166, and another one of the exhaust streams $S_2$ flows into the second passageway 196, 396 and into the mixing chamber 166. The two exhaust streams $S_1$, $S_2$ and the reducing agent injected into the mixing chamber 166 through the port 200 interact to form a vortex inside the mixing chamber 166. The swirling action of the interacted streams facilitates decomposition of the reducing agent to produce ammonia ($NH_3$). As shown at least in FIGS. 5 and 10, another one of the exhaust streams $S_3$ flows into the bypass chamber 198. Heat from the exhaust stream $S_3$ flowing through the bypass chamber 198 transfers through divider 174 to the reducing agent inside the mixing chamber 166 to maintain the reducing agent at a temperature above its crystallization temperature. By preventing crystallization, the reducing agent remains in proper reactive form for suitable production of ammonia gas during its interaction with the other exhaust streams $S_1$, $S_2$ inside the mixing chamber 166.

The exhaust stream $S_3$ exits bypass chamber 198 through the bypass outlet 226, and merges with the mixture containing the exhaust streams $S_1$, $S_2$ and the reducing agent exiting the mixing chamber 166 through the chamber outlet 218, 418. The merged streams $S_1$-$S_3$ the reducing agent, and the ammonia generated in the mixing chamber 166 and any ammonia generated by the merger of the three exhaust stream $S_1$-$S_3$ flow into the first treatment block 138 where the $NO_x$ gases in the exhaust are reduced by selective catalytic reduction. In particular, the ammonia ($NH_3$) produced by the decomposition of the reducing agent (such as urea) reacts with the $NO_x$ gases (including nitrous oxide (NO), nitrogen dioxide ($NO_2$)) from the exhaust to produce nitrogen ($N_2$) and water ($H_2O$), as shown in Reactions 3-5 below:

$$4NO+4HN_3+O_2 \rightarrow 4N_2+6H_2O \quad \text{(Reaction 3);}$$

$$2NO_2+4NH_3+O_2 \rightarrow 3N_2+6H_2O \quad \text{(Reaction 4); and}$$

$$NO+NO_2+2NH_3 \rightarrow 2N_2+3H_2O \quad \text{(Reaction 5).}$$

Several secondary reactions may also take place, which tend to produce environmentally-acceptable products including ammonium sulfate (($NH_4)_2SO_4$) and ammonium bisulfate ($NH_4HSO_4$). The reaction products and the remaining unreacted components of the exhaust can then be released to the atmosphere surrounding the vehicle 12 at second end 112 of the outlet pipe 114.

Figure 13:
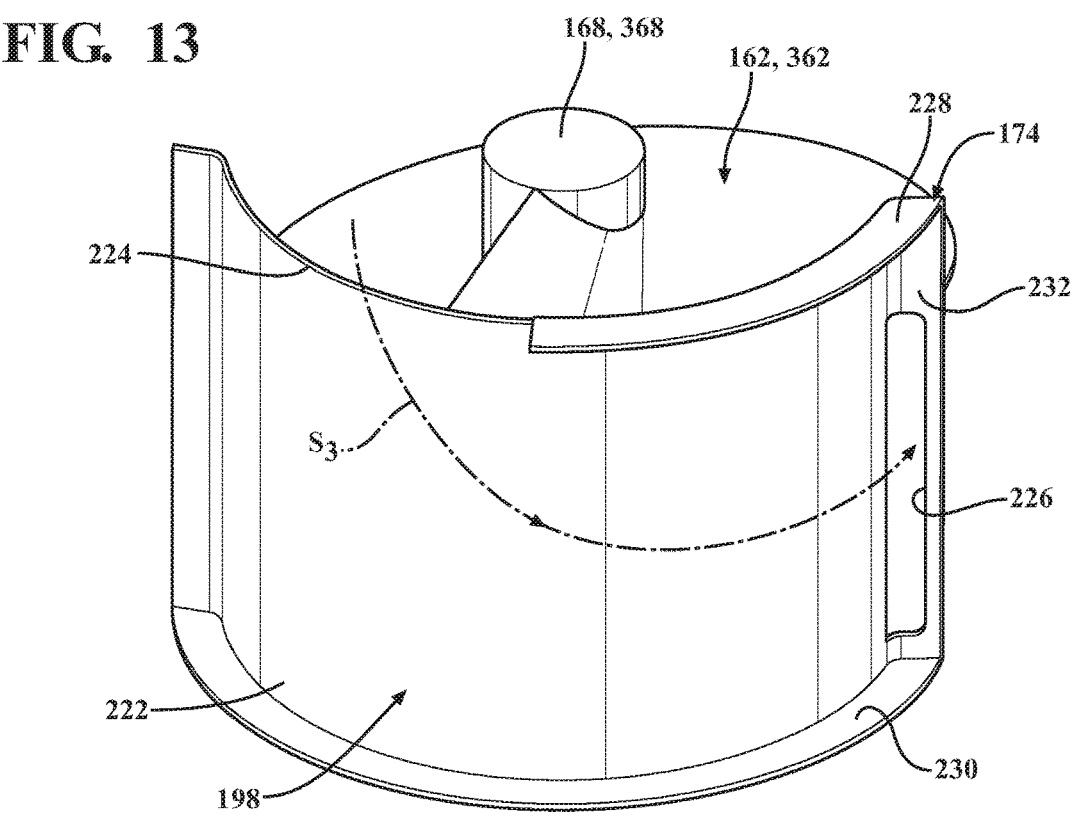
FIG. 13 is a perspective view of a portion of the exhaust line including the divider partially defining a bypass chamber for receiving a portion of the exhaust generated by the engine of the vehicle.

In the embodiment shown in FIG. 13, the bypass chamber 198 is open which allows the exhaust stream $S_3$ to flow freely through the bypass chamber 198 toward the bypass outlet 226. In this embodiment, the exhaust stream $S_3$ travels through the bypass chamber 198 with laminar flow. Heat is transferred through the divider 174 to the reducing agent inside the mixing chamber 166 whenever the exhaust stream $S_3$ contacts the second surface 222 of the divider 174.

In an embodiment, the exhaust line 100 further includes a heat transfer element 234 disposed within the bypass chamber 198 with the heat transfer element operable to transfer heat from the other portion of the exhaust (exhaust stream $S_3$) to the reducing agent inside the mixing chamber 166. In another embodiment, the exhaust line 100 has a plurality of heat transfer elements 234 disposed within the bypass chamber 198. As shown in FIGS. 14-17, the heat transfer element(s) 234 is typically formed from any suitable heat transfer material such as a metal, and the heat transfer element(s) 234 is directly attached to the second surface 222 of the divider 174. The heat transfer element(s) 234 may be directly attached to the divider 174 in any suitable fashion. In one particular embodiment, the heat transfer element(s) 234 is directly attached to the divider 174 by welding. In addition, and as best shown in FIG. 14A, the heat transfer element(s) 234 is spaced from the second segment 155 of the continuous wall 154 of the mixing housing 144. With this arrangement, heat from the exhaust is transferred mainly inwardly toward the divider 174 rather than outwardly toward the continuous wall 154 of the mixing housing 144.

Various embodiments of the heat transfer element(s) 234 are shown in FIGS. 14-17. It is to be appreciated that these embodiments are non-limiting and the heat transfer element(s) 234 can have any suitable configuration and/or arrangement inside the bypass chamber 198. In addition, the heat transfer element(s) 234 can be positioned at any desired location on the second surface 222 of the divider 174. In an embodiment, the heat transfer element(s) 234 is positioned at selected locations on the second surface 222 of the divider 174 based on estimated locations that the reducing agent will likely contact the first surface 220 of the divider 174 when the reducing agent is injected into the mixing chamber 166.

In an embodiment, the heat transfer element(s) 234 has at least one of a smooth configuration, an accordion configuration, and a circular configuration. In the embodiment shown in FIG. 14, the exhaust line 100 has a plurality of heat transfer elements 234, with each heat transfer element 234 having a smooth configuration. Each of the heat transfer elements 234 extends through the bypass chamber 198 from the bypass inlet 224 to the bypass outlet 226. In an alternative arrangement, the heat transfer elements 234 could extend partially through the bypass chamber 198, such as from the bypass inlet 224 through a portion of the bypass chamber 198. Additionally, each of the plurality of heat transfer elements 234 is spaced from an adjacent one of the plurality of heat transfer elements 234. Any desired spacing between adjacent heat transfer elements 234 can be used. The heat transfer elements 234 are typically spaced enough to enable the exhaust stream $S_3$ to flow between and interact with the adjacent heat transfer elements 234. The spacing between adjacent heat transfer elements 234 may be the same from the bypass inlet 224 to the bypass outlet 226, or may vary from the bypass inlet 224 to the bypass outlet 226. Additionally, the spacing between one set of adjacent heat transfer elements 234 may be the same or different from the spacing from another set of adjacent heat transfer elements 234.

Figure 14:
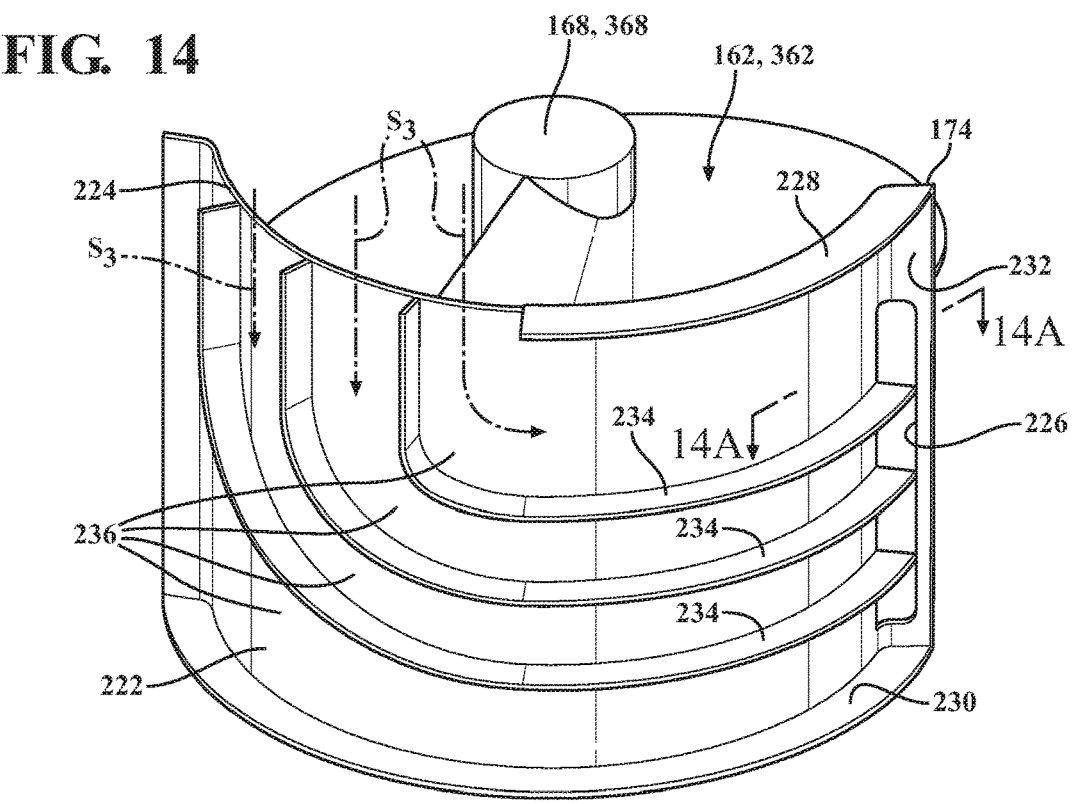
FIG. 14 is a perspective view of a portion of the exhaust line including the divider partially defining a bypass chamber, and a plurality of heat transfer elements disposed in the bypass chamber according to an embodiment of the present disclosure.
Figure 14A:
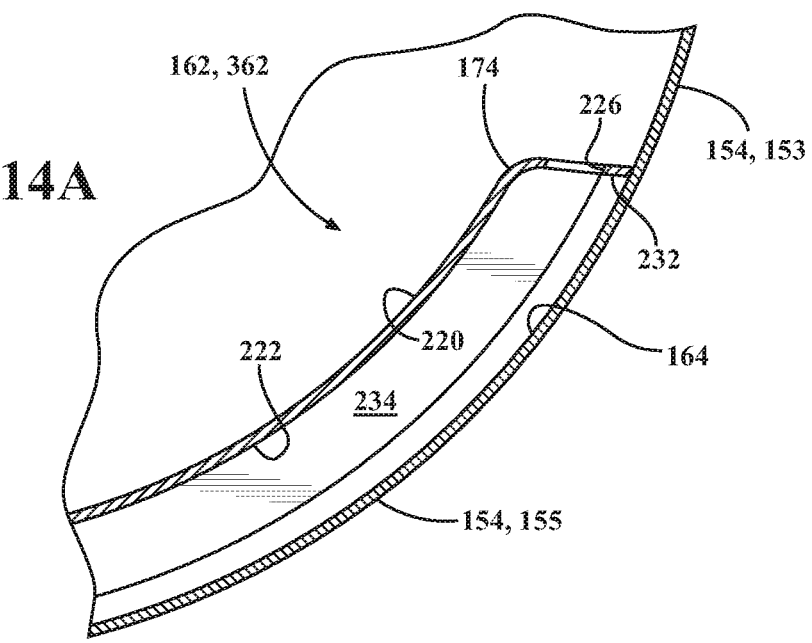
FIG. 14A is a top cross sectional view of the portion of the exhaust line taken along ling 14A-14A in FIG. 14.

The plurality of heat transfer elements 234 in the embodiment shown in FIG. 14 are arranged in layers to form a plurality of bypass channels 236 for receiving the other portion of the exhaust (exhaust stream $S_3$) from the bypass inlet 224. As shown, each of the bypass channels 236 is in fluid communication with the bypass inlet 224 for receiving the portion of the exhaust, and is in fluid communication with the bypass outlet 226 for releasing the portion of the exhaust. In addition, one of the bypass channels 236 is defined between the first lip 228 of the divider 174 and one of the heat transfer elements 234. Another one of the bypass channels 236 is defined between the second lip 230 of the divider 174 and another one of the heat transfer elements 234. The remaining bypass channels 236 are defined between adjacent heat transfer elements 234. Each of the bypass channels 236 may have any suitable size. In addition, the size of each of the bypass channels 236 may be the same from the bypass inlet 224 to the bypass outlet 226, or may vary from the bypass inlet 224 to the bypass outlet 226. Additionally, the size of one of the bypass channels 236 may be the same or different from the size of another one of the bypass channels 236.

In use, the portion of the exhaust (exhaust stream $S_3$) enters the bypass chamber 198 through the bypass inlet 224 and splits into multiple smaller exhaust streams with each stream flowing through a respective one of the bypass channels 236. As the smaller exhaust streams contact the adjacent heat transfer elements 234, heat is transferred from the exhaust streams, through the heat transfer elements 234, through the divider 174, and to the reducing agent inside the mixing chamber 166. Additionally, turbulence of the exhaust steams increases each time the exhaust streams contact the adjacent heat transfer elements 234. The turbulent or substantially turbulent flow of the exhaust streams facilitates heat transfer, as well as proper mixing of the exhaust streams with the exhaust streams exiting the mixing chamber 166 through the mixing outlet 218, 418.

Figure 15:
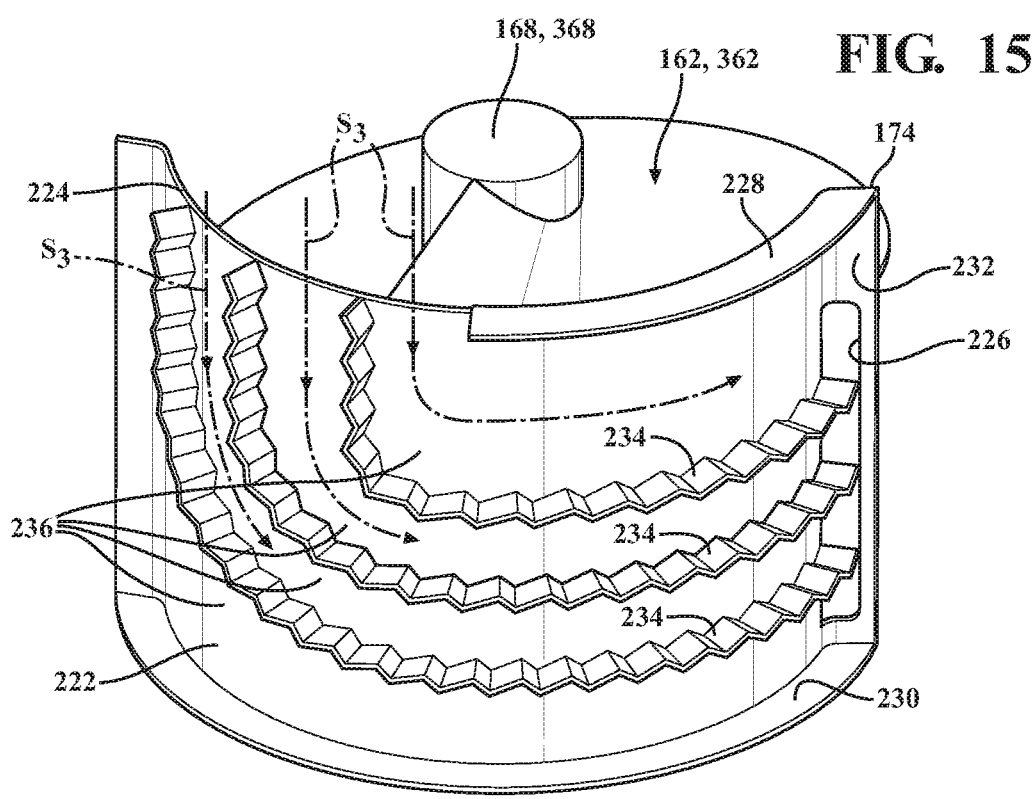
FIG. 15 is a perspective view of a portion of the exhaust line including the divider partially defining a bypass chamber, and a plurality of heat transfer elements disposed in the bypass chamber according to another embodiment of the present disclosure.

In the embodiment shown in FIG. 15, the exhaust line 100 has a plurality of heat transfer elements 234, with each heat transfer element 234 having an accordion configuration. Other than the accordion configuration, the arrangement of the heat transfer elements 234 in FIG. 15 is the same as the embodiment shown in FIG. 14. Heat transfer and turbulent flow of the exhaust streams are improved because as the exhaust streams contact the additional contact surfaces provided by the accordion configuration of the heat transfer elements 234.

Figure 16:
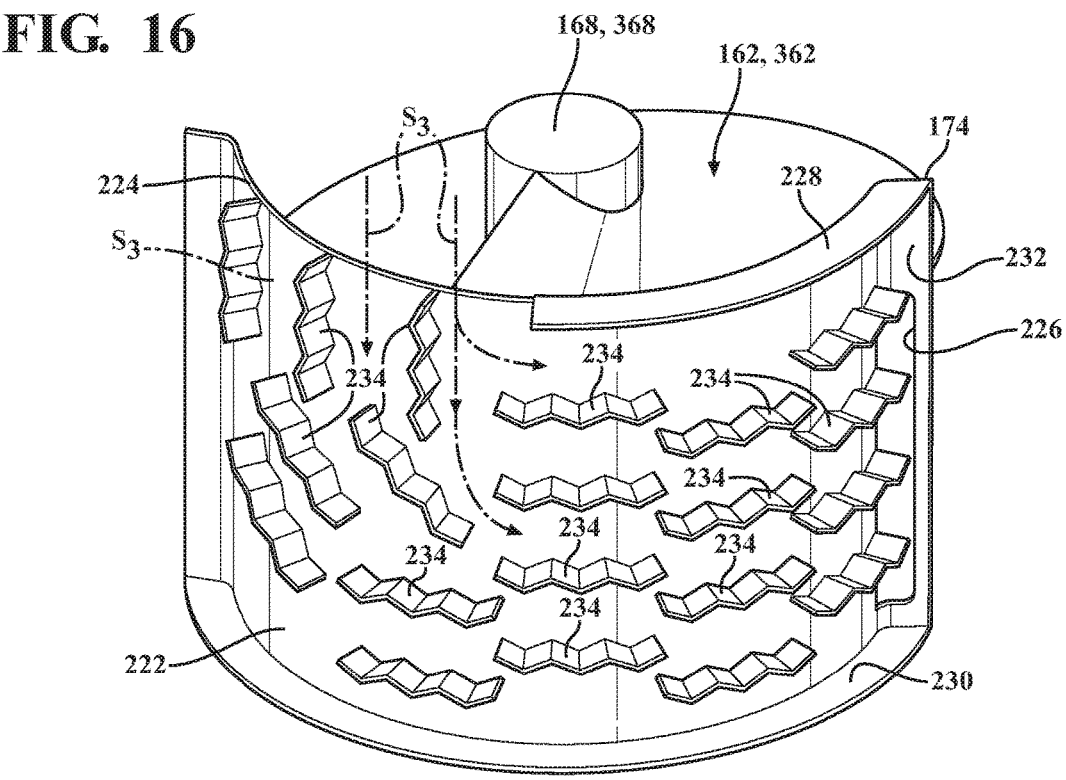
FIG. 16 is a perspective view of a portion of the exhaust line including the divider partially defining a bypass chamber, and a plurality of heat transfer elements disposed in the bypass chamber according to another embodiment of the present disclosure.

In the embodiment shown in FIG. 16, the exhaust line 100 has a plurality of heat transfer elements 234 attached to the second surface 222 of the divider 174 in a staggered arrangement. In the embodiment shown, the heat transfer elements 234 have an accordion configuration, and each heat transfer element 234 extends partially across the bypass chamber 198. In other words, none of the heat transfer elements 234 extend from the bypass inlet 224 to the bypass outlet 226. The heat transfer elements 234 may be arranged in any desirable fashion. Although staggered, in the embodiment shown, the heat transfer elements 234 are arranged to direct flow of the exhaust stream $S_3$ from the bypass inlet 224 to the bypass outlet 226. In addition, some of the heat transfer elements 234 may be arranged adjacent the bypass inlet 224, which causes the exhaust stream $S_3$ to split into multiple smaller exhaust streams. The smaller exhaust streams contact the several heat transfer elements 234 as the exhaust flows through the bypass chamber 198. The increased interaction with the several heat transfer elements 234 in this embodiment improves both turbulence of the exhaust and heat transfer from the exhaust to the reducing agent inside the mixing chamber 166.

Figure 17:
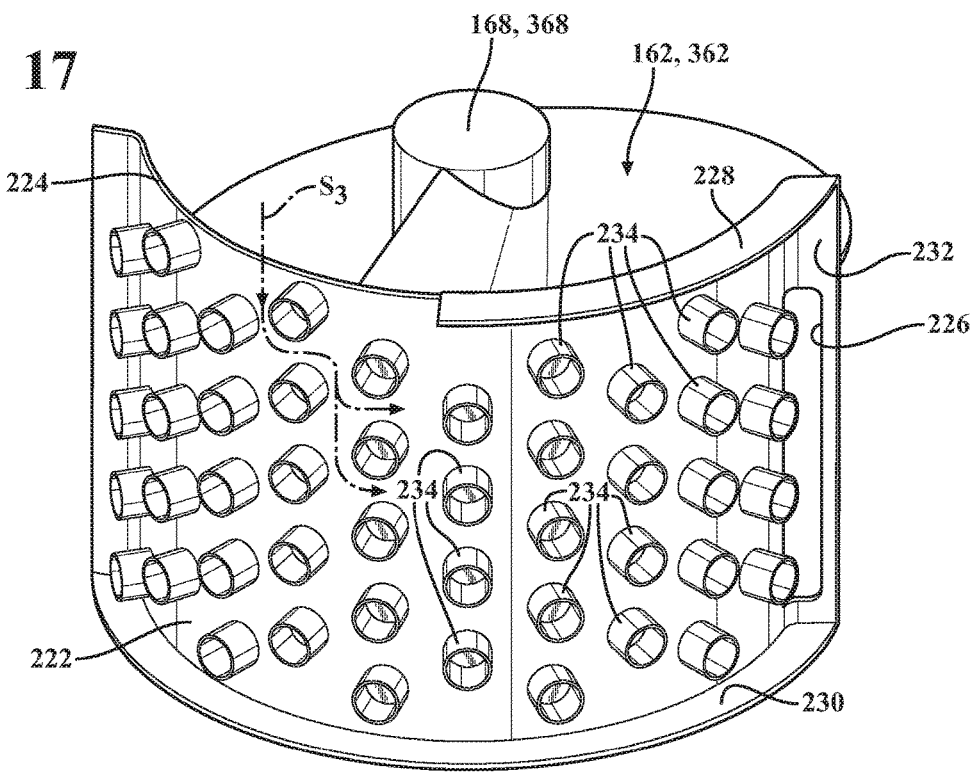
FIG. 17 is a perspective view of a portion of the exhaust line including the divider partially defining a bypass chamber, and a plurality of heat transfer elements disposed in the bypass chamber according to yet another embodiment of the present disclosure.

In the embodiment shown in FIG. 17, the exhaust line 100 has a plurality of heat transfer elements 234 arranged in columns with each column having a selected number of heat transfer elements 234. In addition, the heat transfer elements 234 of one of the columns is offset from the heat transfer elements 234 of an adjacent one of the columns. In this embodiment, each of the heat transfer elements 234 has a circular configuration. The exhaust stream $S_3$ enters the bypass chamber 198 through the bypass inlet 224 and interacts with the several heat transfer elements 234 as the exhaust flows through the chamber 198. With the circular configuration and the arrangement of the heat transfer elements 234 inside the bypass chamber 198, the exhaust contacts the heat transfer elements 234 often which increases turbulence of the exhaust stream and increases heat transfer through the divider 174 to the reducing agent inside the mixing chamber 166. It is to be appreciated that alternative arrangements of the heat transfer elements 234 inside the bypass chamber 198 and alternative configurations of the heat transfer elements 234 are contemplated herein.

As previously mentioned, the exhaust stream $S_3$ exits the bypass chamber 198 through the bypass outlet 226. The exhaust stream $S_3$ then merges with the swirling mixture of the other exhaust streams $S_1$, $S_2$ and the reducing agent. In addition to improving heat transfer, the turbulent flow of the exhaust stream $S_3$ exiting the bypass chamber 198 facilitates mixing with the other exhaust streams $S_1$, $S_2$ and the reducing agent when the streams are merged. The merged streams, which continue to mix by virtue of the swirling motion of the mixture generated in the mixing chamber 166 and the turbulent flow of the exhaust stream $S_3$ in the bypass chamber 198, flow into the first treatment block 138 for treatment of the exhaust as described in detail above.

The invention has been described in an illustrative manner, and it is be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. An exhaust line for a vehicle having an engine generating an exhaust and a device for supplying a reducing agent for use during treatment of the exhaust, said exhaust line comprising:
   a mixing housing having a continuous wall defining upstream and downstream ends with said wall further defining an opening extending between said upstream and downstream ends and a port for receiving the reducing agent from the device with said wall having first and second segments;
   a first treatment block adjacent said downstream end of said mixing housing for treatment of the exhaust;
   a baffle disposed within said opening of said mixing housing; and
   a divider disposed between said wall and said baffle with said divider having first and second surfaces, said first surface of said divider, said first segment of said wall, and said baffle defining a mixing chamber in fluid communication with said upstream end for receiving a portion of the exhaust, and said mixing chamber in fluid communication with said port for receiving the reducing agent;
   said second surface of said divider facing said second segment of said wall and defining a bypass chamber adjacent said mixing chamber with said divider defining a bypass inlet facing said upstream end for receiving another portion of the exhaust and a bypass outlet facing said downstream end for releasing the other portion of the exhaust with said divider operable to transfer heat from the other portion of the exhaust passing through said bypass chamber to the reducing agent inside said mixing chamber for effective treatment of the exhaust.

2. The exhaust line as set forth in claim 1 wherein said baffle extends between said upstream and downstream ends.

3. The exhaust line as set forth in claim 1 wherein said divider further has a first lip adjacent said upstream end of said continuous wall and extending toward said second segment of said continuous wall with said first lip defining said bypass inlet at said upstream end for receiving the other portion of the exhaust.

4. The exhaust line as set forth in claim 3 wherein said divider further has second and third lips with said second lip adjacent said downstream end of said continuous wall and said third lip between said first and second lips and each of said second and third lips extending toward said second segment of said continuous wall, with said second and third lips defining said bypass outlet adjacent said downstream end for releasing the other portion of the exhaust.

5. The exhaust line as set forth in claim 1 wherein said baffle and said second surface of said divider define a chamber outlet at said downstream end for releasing the portion of the exhaust and the reducing agent, said chamber outlet adjacent said bypass outlet for enabling the other portion of the exhaust to merge with the portion of the exhaust and the reducing agent.

6. The exhaust line as set forth in claim 1 wherein said continuous wall has a circumference and said divider extends along less than half of said circumference.

7. The exhaust line as set forth in claim 1 further comprising a heat transfer element disposed within said bypass chamber with said heat transfer element operable to transfer heat from the other portion of the exhaust to the reducing agent inside said mixing chamber.

8. The exhaust line as set forth in claim 7 wherein said heat transfer element is directly attached to said second surface of said divider.

9. The exhaust line as set forth in claim 7 said heat transfer element is spaced from said second segment of said continuous wall.

10. The exhaust line as set forth in claim 7 wherein said heat transfer element extends through said bypass chamber from said bypass inlet to said bypass outlet.

11. The exhaust line as set forth in claim 7 wherein said heat transfer element has at least one of a smooth configuration, an accordion configuration, and a circular configuration.

12. The exhaust line as set forth in claim 7 wherein said heat transfer element is one of a plurality of heat transfer elements with each one of said plurality of heat transfer elements being spaced from an adjacent one of said plurality of heat transfer elements.

13. The exhaust line as set forth in claim 12 wherein said plurality of heat transfer elements are arranged in layers to form a plurality of bypass channels for receiving the other portion of the exhaust from said bypass inlet.

14. The exhaust line as set forth in claim 12 wherein said plurality of heat transfer elements is attached to said second surface of said divider in a staggered arrangement.

15. The exhaust line as set forth in claim 12 wherein said plurality of heat transfer elements is arranged in columns with each column having a selected number of said heat transfer elements, and said heat transfer elements of one of said columns being offset from said heat transfer elements of an adjacent one of said columns.

16. An exhaust line for a vehicle having an engine generating an exhaust and a device for supplying a reducing agent for use during treatment of the exhaust, said exhaust line comprising:
a mixing housing having a continuous wall defining upstream and downstream ends with said wall further defining an opening extending between said upstream and downstream ends and a fluid port for receiving the reducing agent from the device;
a first treatment block adjacent said downstream end of said mixing housing for treatment of the exhaust; and
a baffle disposed within said opening of said mixing housing with said baffle and at least a portion of said wall defining a mixing chamber for mixing the exhaust and the reducing agent;
said baffle defining a center axis and having a first flange partially defining a first exhaust inlet and a first exhaust exit offset from said center axis with said first exhaust inlet and said first exhaust exit defining a first passageway extending in a direction substantially parallel to and offset from said center axis for delivering a portion of the exhaust to said mixing chamber;
said baffle further having a ramped surface partially defining a second exhaust inlet and a second exhaust exit offset from said center axis with said second exhaust inlet and said second exhaust exit defining a second passageway with said second passageway at said second exhaust exit extending in a direction transverse to said first passageway for delivering another portion of the exhaust to said mixing chamber so that the portions of the exhaust and the reducing agent intersect to form a vortex in said mixing chamber; and
said fluid port in fluid communication with said mixing chamber and said fluid port defining a port axis extending transverse to said center axis with said port axis defining a plane extending through said mixing chamber with a surface of said first exhaust exit of said first flange located entirely on one side of said plane for directing the portion of the exhaust passing through said first passageway.

17. The exhaust line as set forth in claim 16 wherein said second exhaust exit is located at another side of said plane.

18. The exhaust line as set forth in claim 17 wherein said first passageway extends between said continuous wall and said plane.

19. The exhaust line as set forth in claim 16 wherein said first and second exhaust exits are located at the same side of said plane.

20. The exhaust line as set forth in claim 19 wherein said first passageway extends between said center axis and said plane.

21. The exhaust line as set forth in claim 16 wherein said baffle further has a post extending along said center axis with said ramped surface coupled to and curved around said post to form a helix.

22. The exhaust line as set forth in claim 21 wherein said ramped surface partially defines a chamber outlet at said downstream end of said mixing housing for releasing the exhaust and the reducing agent and said ramped surface is continuous from said second exhaust inlet to said chamber outlet.

23. The exhaust line as set forth in claim 21 wherein said baffle has a second flange extending from said post with said second flange, said post, said ramped surface, and said continuous wall defining said second exhaust exit.

24. The exhaust line as set forth in claim 16 wherein said baffle has a second flange with said second flange, said ramped surface, and said continuous wall defining said second exhaust exit.

25. The exhaust line as set forth in claim 24 wherein said first and second flanges partially define said first exhaust inlet.

26. The exhaust line as set forth in claim 21 wherein said ramped surface partially defines an chamber outlet at said downstream end of said mixing housing for releasing the exhaust and the reducing agent.

27. The exhaust line as set forth in claim 26 wherein said ramped surface has first and second ramped portions and a stepped portion interconnecting said first and second ramped portions.

28. The exhaust line as set forth in claim 27 wherein said first ramped portion has substantially the same pitch as said second ramped portion.

29. The exhaust line as set forth in claim 28 wherein said stepped portion is transverse to said first and second ramped portions.

30. The exhaust line as set forth in claim 16 wherein said ramped surface forms a helix and a portion of said mixing chamber is defined below said helix and between said center axis and a portion of said continuous wall.

31. The exhaust line as set forth in claim 16 further comprising a second treatment block adjacent said upstream end of said mixing housing for filtering the exhaust generated by the engine.

* * * * *